US012540492B2

(12) United States Patent
Nakaishi

(10) Patent No.: US 12,540,492 B2
(45) Date of Patent: Feb. 3, 2026

(54) ELECTRIC LOCK DEVICE

(71) Applicant: U-SHIN LTD., Nagano (JP)

(72) Inventor: Kazuhiro Nakaishi, Hiroshima (JP)

(73) Assignee: MINEBEA MITSUMI Inc., Nagano (JP)

(*) Notice: Subject to any disclaimer, the term of this patent is extended or adjusted under 35 U.S.C. 154(b) by 57 days.

(21) Appl. No.: 18/723,947

(22) PCT Filed: Dec. 28, 2021

(86) PCT No.: PCT/JP2021/048947
§ 371 (c)(1),
(2) Date: Jun. 25, 2024

(87) PCT Pub. No.: WO2023/127148
PCT Pub. Date: Jul. 6, 2023

(65) Prior Publication Data

US 2025/0067088 A1 Feb. 27, 2025

(51) Int. Cl.
*E05B 63/00* (2006.01)
*E05B 17/00* (2006.01)
*E05B 47/00* (2006.01)

(52) U.S. Cl.
CPC ........ *E05B 63/0069* (2013.01); *E05B 17/005* (2013.01); *E05B 2047/0054* (2013.01); *E05B 2047/0067* (2013.01)

(58) Field of Classification Search
CPC ........ E05B 47/02; E05B 47/026; E05B 17/22; E05B 43/005; E05B 2047/0067; E05B 2047/0084; E05B 2047/0085; E05B 2047/0091; E05B 2047/0094; E05B 2047/0095; E05B 63/0065; E05B 17/005; E05B 2047/005; E05B 2047/0053; E05B 2047/0069; E05B 2047/0054
See application file for complete search history.

(56) References Cited

U.S. PATENT DOCUMENTS

| | | | | |
|---|---|---|---|---|
| 6,216,502 | B1 * | 4/2001 | Cannella | E05B 47/0012 292/144 |
| 2021/0262251 | A1 | 8/2021 | Taniuchi et al. | |

FOREIGN PATENT DOCUMENTS

| | | | | |
|---|---|---|---|---|
| JP | 2003-343126 | A | 12/2003 | |
| JP | 2014224427 | A * | 12/2014 | |
| JP | 2020-059996 | A | 4/2020 | |
| KR | 20090010394 | U * | 10/2009 | E05B 47/00 |
| WO | WO-2016130386 | A1 * | 8/2016 | G07C 9/00182 |

(Continued)

OTHER PUBLICATIONS

International Search Report for corresponding International Application No. PCT/JP2021/048947 mailed Mar. 1, 2022.

(Continued)

*Primary Examiner* — Christine M Mills
*Assistant Examiner* — Peter H Watson
(74) *Attorney, Agent, or Firm* — Chrisman Gallo Tochtrop LLC

(57) ABSTRACT

Upon detecting that an operation knob is operated from a lock position to an unlock position within a set time Tset_a and is operated to the lock position based on an input from a potential sensor 15, a control portion 13 of an electronic lock device switches from self-lock control to self-lock temporary stopping control.

5 Claims, 26 Drawing Sheets

(56) References Cited

FOREIGN PATENT DOCUMENTS

WO 2020/003487 A1 1/2020

OTHER PUBLICATIONS

Written Opinion for corresponding International Application No. PCT/JP2021/048947 dated Mar. 1, 2022.
Extended European Search Report dated Jul. 3, 2025 for corresponding European Application No. 21970028.3.

* cited by examiner

ELECTRIC LOCK DEVICE

CROSS-REFERENCE TO RELATED APPLICATIONS

This is a national phase application in the United States of International Patent Application No. PCT/JP2021/048947 with an international filing date of Dec. 28, 2021, the contents of which are incorporated herein by reference.

TECHNICAL FIELD

The present invention relates to an electric lock device.

BACKGROUND ART

In a retrofitted electronic lock device to be attached to an existing door of a building, self-lock control for preventing unlock is executed. That is, the electronic lock device automatically executes locking when a certain period of time elapses after being locked to unlocked, or when the door is from an open state to a close state. However, when going out for a short time for chores such as waste disposal, the user often manually unlocks the electronic lock device by operating a thumb turn on the indoor side without carrying a key (including not only a cylinder lock but also a portable machine and a smartphone) and goes out with the door opened. In this case, if the user closes the door as it is, the user is locked out to the outdoors as a result of locking by self-lock control.

WO-A-2020/003487 discloses an electronic lock device that can temporarily stop self-lock control where necessary such as when going out for a short time. Specifically, in order to temporarily stop self-lock control, it is necessary to operate an operation knob to an unlock position a plurality of times within a certain period of time.

Self-lock temporary stopping control in the electronic lock device of WO-A-2020/003487 has the following problem. First, in this electronic lock device, it is necessary to operate the operation knob to the unlock position a plurality of times for the self-lock temporary stopping control. On the other hand, when the operation knob is operated to a lock position after the self-lock temporary stopping control, the electronic lock device is switched to the self-lock control. Therefore, even if the operation knob is operated a plurality of times between the lock position and the unlock position for the self-lock temporary stopping control, if the operation knob is erroneously ended up at the lock position, switching to the self-lock temporary stopping control is not performed. That is, there is a possibility that switching to the self-lock temporary stopping control is not executed by an erroneous operation contrary to the user's original intention. Next, in order to set the operation knob to the unlock position a plurality of times within a certain period of time for the self-lock temporary stopping control, the user needs to remember how many times he/she has operated the knob. In this respect, a complicated operation is required.

SUMMARY OF THE INVENTION

Problems to be Solved by the Invention

An object of the present invention is to reduce possibility of an erroneous operation and improve operability in self-lock temporary stop control of an electronic lock device.

Solutions to the Problems

A first aspect of the present invention provides an electronic lock device including: a body attached to a door including a lock/unlock portion for a switching operation between locking and unlocking; a coupling portion mechanically coupled to the lock/unlock portion; a manual operation portion that is provided in the body, operates integrally with the coupling portion, and is manually operable among a lock position where the door is locked by the lock/unlock portion via the coupling portion and an unlock position where the door is unlocked by the lock/unlock portion via the coupling portion; a position detection portion that detects which of the lock position and the unlock position the manual operation portion is positioned in; a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stop the self-lock control when a predetermined time elapses after the position detection portion detects that the lock/unlock portion has changed from the lock position to the unlock position, in which the control portion switches from the self-lock control to the self-lock temporary stop control upon detecting that the manual operation portion is operated from the lock position to the unlock position within a first set time and is operated to the lock position again based on an input from the position detection portion.

A second aspect of the present invention provides an electronic lock device including: a body attached to a door including a lock/unlock portion for a switching operation between locking and unlocking; a coupling portion mechanically coupled to the lock/unlock portion; a manual operation portion that is provided in the body; operates integrally with the coupling portion, and is manually operable among a lock position where the door is locked by the lock/unlock portion via the coupling portion, an unlock position where the door is unlocked by the lock/unlock portion via the coupling portion, and a neutral position between the lock position and the unlock position; a position detection portion that detects which of the lock position, the unlock position, and a neutral position the manual operation portion is positioned in; a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stopping the self-lock control when a predetermined time elapses after the position detection portion detects that the lock/unlock portion has changed from the lock position to the unlock position, in which the control portion switches from the self-lock control to the self-lock temporary stop control upon detecting that the manual operation portion is operated from the lock position to the neutral position within a second set time and is operated to the lock position again based on an input from the position detection portion.

According to the first aspect of the present invention, the manual operation portion is operated from the lock position to the unlock position within a certain period of time (within the first set time), and is operated to the lock position again, whereby the self-lock control can be switched to the self-lock temporary stop control. According to the second aspect of the present invention, the manual operation portion is operated from the lock position to the neutral position within a certain period of time (within the second set time), and is operated to the lock position again, whereby the self-lock control can be switched to the self-lock temporary stop control.

Switching to the self-lock temporary stop control is performed only by returning the manual operation portion to the original lock position within a certain period of time from the position at the time of operation start for switching to the self-lock temporary stop control, that is, another position from the lock position (the unlocking position in the first aspect and the neutral position in the second aspect). Therefore, it is possible to prevent the user from further operating the manual operation portion contrary to the original intention, thereby preventing the switching to the self-lock temporary stop control from being performed. That is, it is possible to reduce the possibility that the user erroneously operates the manual operation portion contrary to the original intention.

In both the first and second aspects, the self-lock control can be switched to the self-lock temporary stop control only by operating the manual operation portion twice, and therefore the user does not need to memorize the number of times of operation of three or more times of the manual operation portion. In this respect, in both the first and second aspects, it is possible to improve the operability of operation of the manual operation portion required for switching to the self-lock temporary stop control.

A third aspect of the present invention provides an electronic lock device including: a body attached to a door including a lock/unlock portion for a switching operation between locking and unlocking; a coupling portion mechanically coupled to the lock/unlock portion; a manual operation portion that is provided in the body; operates integrally with the coupling portion, and is manually operable among a lock position where the door is locked by the lock/unlock portion via the coupling portion, an unlock position where the door is unlocked by the lock/unlock portion via the coupling portion, and a neutral position between the lock position and the unlock position; a position detection portion that detects which of the lock position, the unlock position, and a neutral position the manual operation portion is positioned in; a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stopping the self-lock control when a predetermined time elapses after the position detection portion detects that the lock/unlock portion has changed from the lock position to the unlock position, in which the control portion switches from the self-lock control to the self-lock temporary stop control upon detecting that the manual operation portion is operated from the unlock position to the neutral position and is maintained at the neutral position for a fifth set time or more based on an input from the position detection portion.

A fourth aspect of the present invention provides an electronic lock device including: a body attached to a door including a lock/unlock portion for a switching operation between locking and unlocking; a coupling portion mechanically coupled to the lock/unlock portion; a manual operation portion that is provided in the body, operates integrally with the coupling portion, and is manually operable among a lock position where the door is locked by the lock/unlock portion via the coupling portion, an unlock position where the door is unlocked by the lock/unlock portion via the coupling portion, and a neutral position between the lock position and the unlock position; a position detection portion that detects which of the lock position, the unlock position, and a neutral position the manual operation portion is positioned in; a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stopping the self-lock control when a predetermined time elapses after the position detection portion detects that the lock/unlock portion has changed from the lock position to the unlock position, in which the control portion switches from the self-lock control to the self-lock temporary stop control upon detecting that the manual operation portion is operated from the lock position to the neutral position and is maintained at the neutral position for a sixth set time or more based on an input from the position detection portion.

According to the third aspect of the present invention, the manual operation portion is operated from the unlock position to the neutral position and held for a certain period of time (fifth set time), whereby the self-lock control can be switched to the self-lock temporary stop control. According to the fourth aspect of the present invention, the manual operation portion is operated from the lock position to the neutral position and held for a certain period of time (fifth set time), whereby the self-lock control can be switched to the self-lock temporary stop control.

Switching is performed by the self-lock temporary stop control by simply holding the manual operation portion at the neutral position for a certain period of time from the position (the unlock position in the third aspect, and the lock position in the fourth aspect) at the operation start for switching to the self-lock temporary stop control. Therefore, it is possible to prevent the user from further operating the manual operation portion contrary to the original intention, thereby preventing the switching to the self-lock temporary stop control from being performed. That is, it is possible to reduce the possibility that the user erroneously operates the manual operation portion contrary to the original intention.

In both the third and fourth aspects, the self-lock control can be switched to the self-lock temporary stop control only by operating the manual operation portion once, and therefore the user does not need to memorize the number of times of operation of the manual operation portion. In this respect, in both the third and fourth aspects, it is possible to improve the operability of operation of the manual operation portion required for switching to the self-lock temporary stop control.

A fifth aspect of the present invention provides an electronic lock device including: a body attached to a door including a lock/unlock portion for a switching operation between locking and unlocking; a coupling portion mechanically coupled to the lock/unlock portion; a manual operation portion that is provided in the body, operates integrally with the coupling portion, and is manually operable among a lock position where the door is locked by the lock/unlock portion via the coupling portion, an unlock position where the door is unlocked by the lock/unlock portion via the coupling portion, and a neutral position between the lock position and the unlock position; a position detection portion that detects which of the lock position, the unlock position, and a neutral position the manual operation portion is positioned in; a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stopping the self-lock control when a predetermined time elapses after the position detection portion detects that the lock/unlock portion has changed from the lock position to the unlock position, in which the control portion switches from the self-lock control to the self-lock temporary stop control upon detecting that the manual operation portion is operated from the lock position to the neutral position, is maintained at the neutral position for a sixth set time or more, and is operated to the unlock position within a seventh set time based on an input from the position detection portion.

According to the fifth aspect of the present invention, the manual operation portion is operated from the unlock position to the neutral position and held for a certain period of time (sixth set time), and is operated to the unlock position within the seventh set time, whereby the self-lock control can be switched to the self-lock temporary stop control. This can switch from the self-lock control to the self-lock temporary stop control by a simple operation of stopping the operation once at the time of the unlock operation, and therefore it is possible to improve the operability of operation of the manual operation portion required for switching to the self-lock temporary stop control.

Effects of the Invention

According to the electronic lock device of the present invention, regarding the self-lock temporary stop control, it is possible to reduce the possibility of erroneous operation and improve operability.

DETAILED DESCRIPTION

Embodiments of the present invention will be described with reference to the accompanying drawings.

First Embodiment

Figure 1:
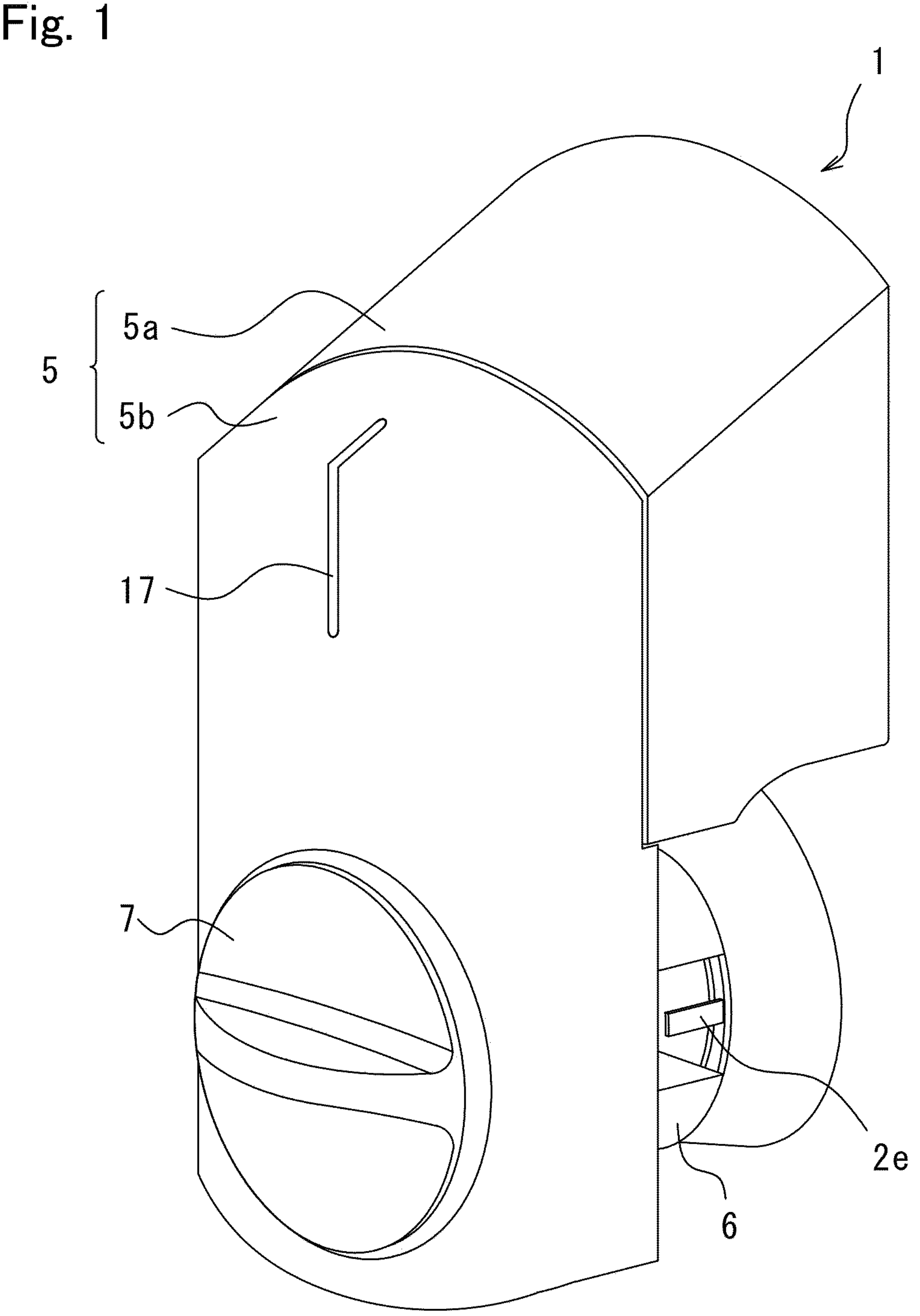
FIG. 1 is a perspective view of an electronic lock device according to a first embodiment of the present invention.
Figure 2:
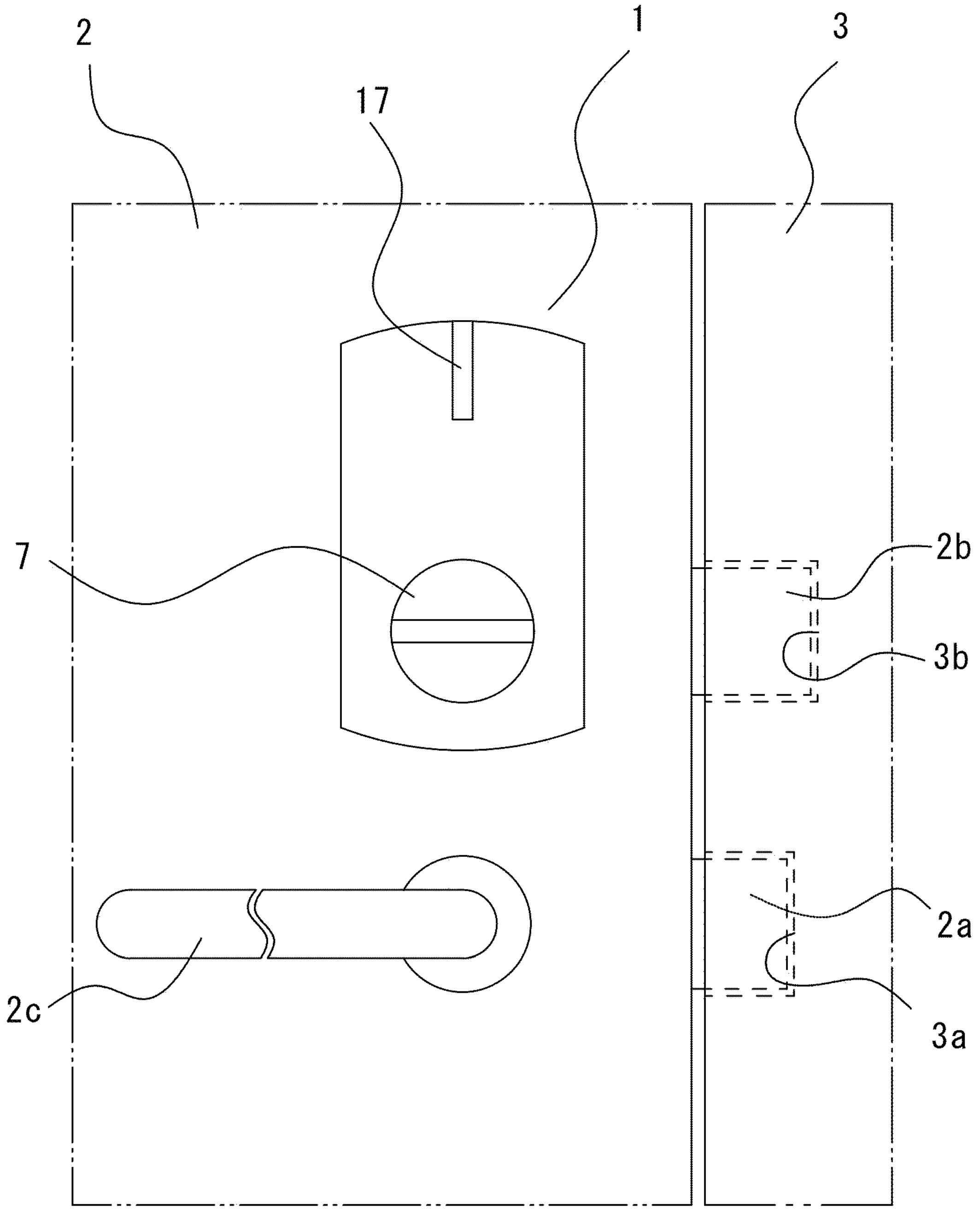
FIG. 2 is a front view showing a state in which the electronic lock device of FIG. 1 is attached to a door.
Figure 3:
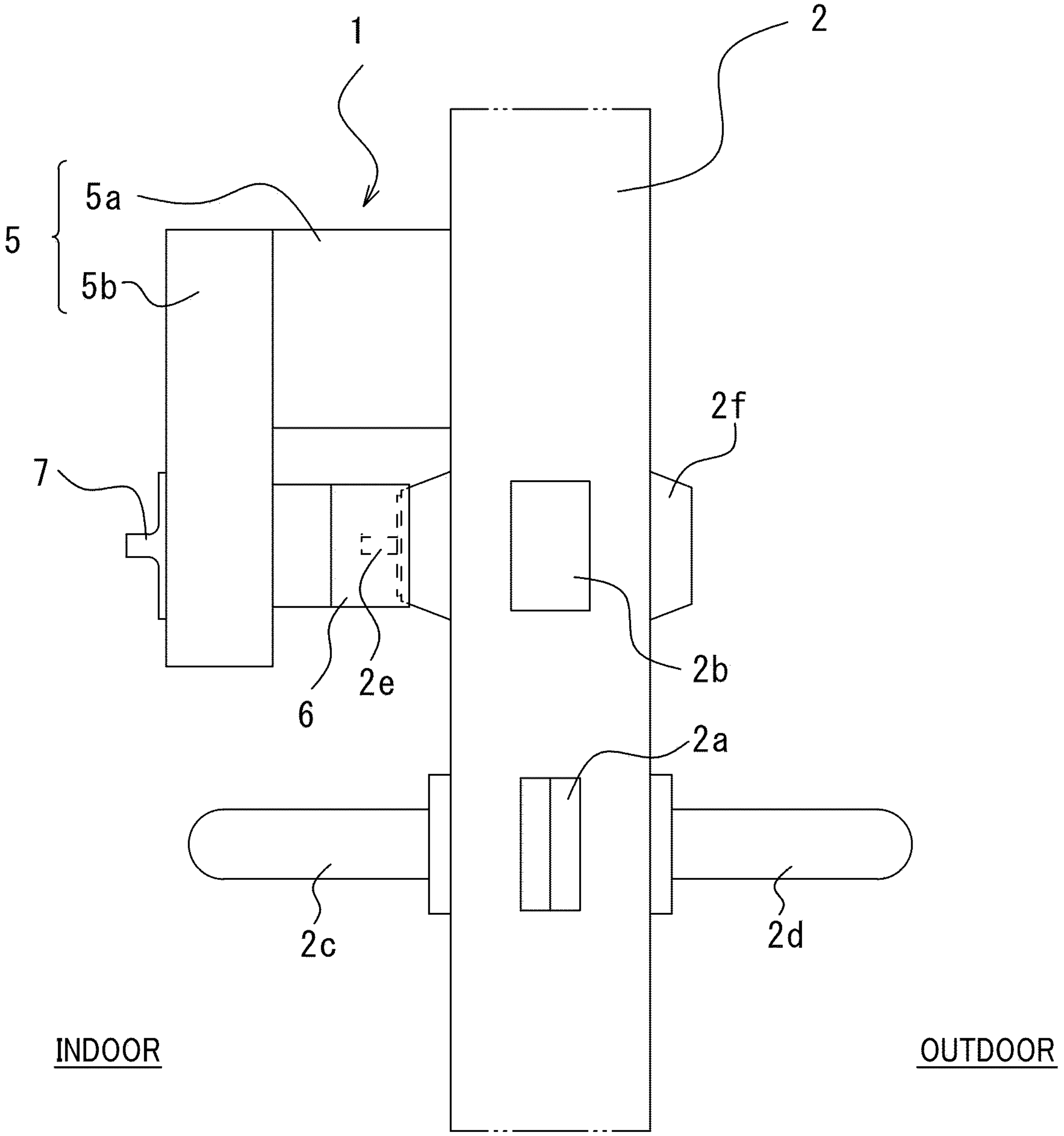
FIG. 3 is a right side view showing a state in which the electronic lock device of FIG. 1 is attached to the door.

FIG. 1 shows an electronic lock device 1 according to the first embodiment of the present invention. As shown in FIGS. 2 and 3, this electronic lock device 1 is used by being retrofitted to a door 2.

With reference to FIGS. 2 and 3, the door 2 includes a latch 2*a* and a deadbolt 2*b* that can be accommodated in accommodation portions 3*a* and 3*b* of a door frame 3.

The latch 2*a* is operated by door handles 2*c* and 2*d* provided on the indoor side and the outdoor side of the door 2, respectively. When the door handles 2*c* and 2*d* shown in FIGS. 2 and 3 are not operated, the latch 2*a* is accommodated in the accommodation portion 3*a* of the door 2. When the door handles 2*c* and 2*d* are rotationally operated from the posture shown in FIGS. 2 and 3, the latch 2*a* can be accommodated in the door 2 and comes out of the accommodation portion 3*a* in response to an opening operation of the door 2.

The deadbolt 2*b* is operated by a thumb turn 2*e* (lock/unlock portion) on the indoor side and a cylinder 2*f* on the outdoor side. The cylinder 2*f* is operated by a key not illustrated. The cylinder 2*f* may be other than a so-called tumbler lock that is operable with a mechanical conventional metal key, and instead of a metal key, for example, a magnetic or electric lock device that is operable by inputting a personal identification number by operating with a portable machine, a smartphone, a card key, or a numeric keypad may be adopted. In place of the thumb turn 2*e*, a button, a switch, a lever, or the like may be adopted.

When the thumb turn 2*c* is at the rotation angle position shown in FIGS. 2 and 3, the deadbolt 2*b* is accommodated in the accommodation portion 3*b*, and even when the door handles 2*c* and 2*d* are operated, the door 2 is maintained in a close state (locked). On the other hand, when the thumb turn 2*e* is operated and rotates counterclockwise by 90 degrees from the rotation angle position shown in FIGS. 2 and 3, the deadbolt 2*b* is pulled into the door 2 and is separated from the accommodation portion 3*b*, and when the door handles 2*c* and 2*d* are operated, the door 2 can be brought from the close state into the open state (unlocked). That is, the rotation operation of the thumb turn 2*e* enables switching operation between locking and unlocking of the door 2. By rotationally operating the cylinder 2*f* with a cylinder lock, similarly, switching operation between locking and unlocking of the door 2 is possible.

With reference to FIGS. 1 to 3, the electronic lock device 1 includes a casing 5 (body) attached to the indoor side of the door 2. The casing 5 includes a pedestal portion 5*a* whose base end is fixed to the door 2 by means such as adhesion and screwing so as to protrude from the door 2, and an operation portion 5*b* provided at a tip end of the pedestal portion 5*a*, positioned at an interval from the door 2, and extending along the door 2.

The electronic lock device 1 includes a thumb turn holder 6 (coupling portion) extending from the operation portion 5*b* of the casing 5 toward the door 2 and mechanically coupled to the thumb turn 2*c*. In place of the thumb turn holder 6, a holder coupled to a rotation shaft of the thumb turn 2*c* that becomes accessible by removing the thumb turn 2*e* from the door 2 may be adopted.

Figure 4:
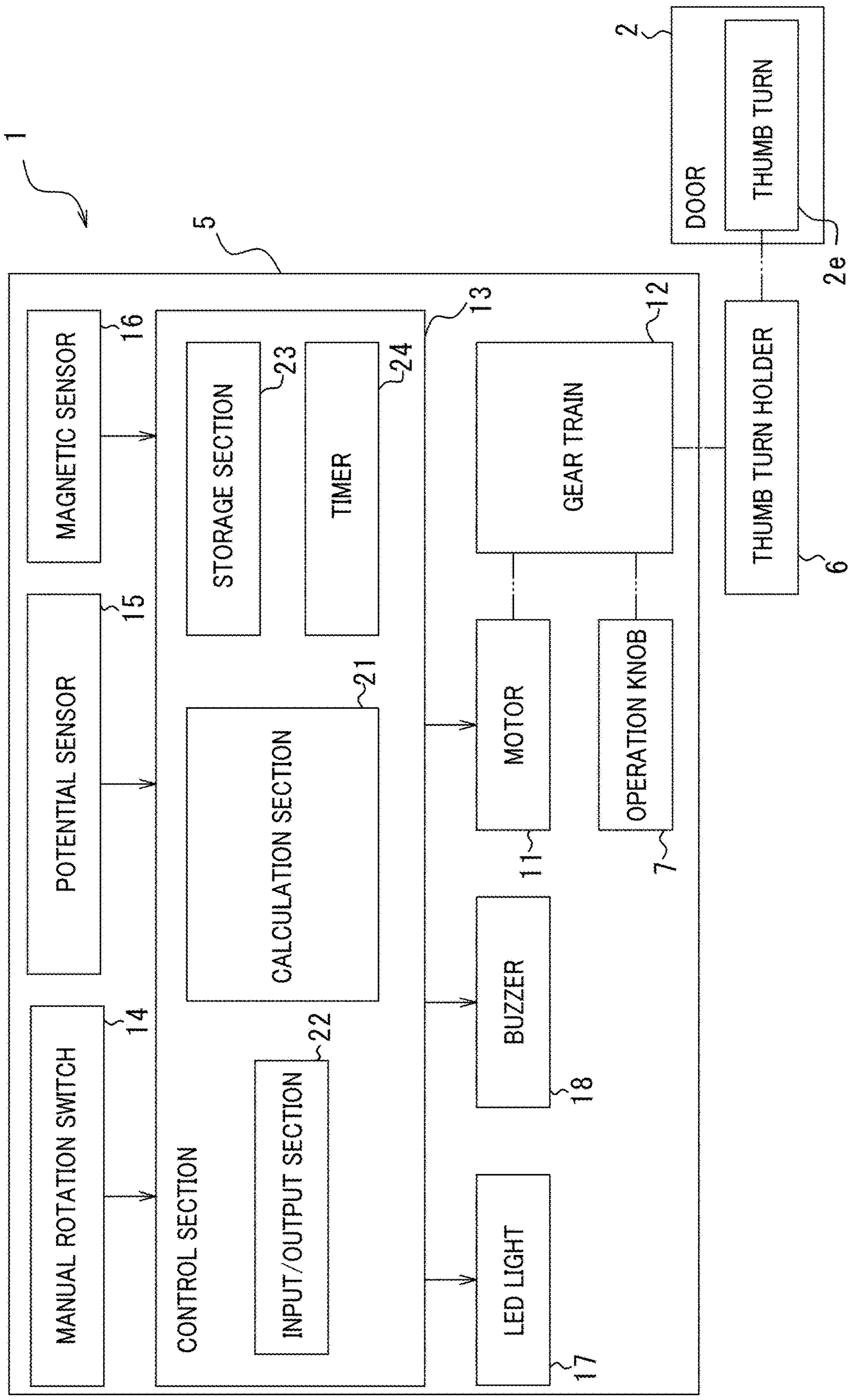
FIG. 4 is a block diagram of the electronic lock device according to the first embodiment of the present invention.

The operation portion 5*b* of the casing 5 is provided with an operation knob 7 of a rotation type. With reference also to FIG. 4, the casing 5 accommodates a motor 11 and a gear train 12. The combination of the operation knob 7 and the gear train 12 constitutes the manual operation portion in the present invention, and the combination of the motor 11 and the gear train 12 constitutes a drive portion.

Figure 5:
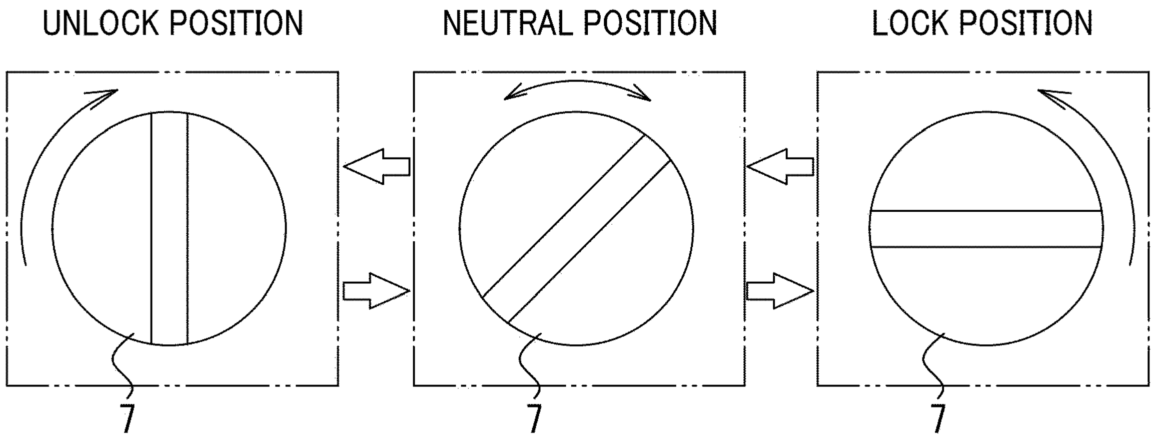
FIG. 5 is a conceptual diagram for explaining a relationship among the unlock position, the lock position, and the neutral position of an operation knob.

The operation knob 7 rotates integrally with the thumb turn holder 6 via the gear train 12. With reference to FIG. 5, the operation knob 7 can be set to the "unlock position", the "lock position", and the "neutral position" by being rotated by manual operation by the user. When the operation knob 7 is rotated to the "unlock position", the thumb turn holder 6, that is, the thumb turn 2*e* also rotates integrally; and the deadbolt 2*b* comes out of the accommodation portion 3*b*, and the door 2 is unlocked. When the operation knob 7 is rotated to the "lock position", the thumb turn holder 6, that is, the thumb turn holder 6 also rotates integrally, and the deadbolt 2*b* is accommodated in the accommodation portion 3*b*, and the door 2 is locked. In the middle of rotating between the "unlock position" and the "lock position", the operation knob 7 passes through the "neutral position". In this manner, the operation knob 7 causes the thumb turn 2*e* to lock and unlock the door 2 via the thumb turn holder 6 by manual operation.

The rotation of the motor 11 is transmitted to the thumb turn holder 6 via the gear train 12. That is, by rotationally driving the thumb turn holder 6 via the gear train 12, the motor 11 causes the thumb turn 2*e* to lock and unlock the door 2.

The rotation of the motor 11 is transmitted to the operation knob 7 via the gear train 12. When the motor 11 rotates in an orientation in which the operation knob 7 rotates to the "unlock position", the thumb turn holder 6, that is, the thumb turn 2*e* rotates, whereby the deadbolt 2*b* comes out of the accommodation portion 3*b* and the door 2 is unlocked. When the motor 11 rotates in an orientation in which the operation knob 7 rotates to the "lock position", the thumb turn holder 6, that is, the thumb turn rotates, whereby the deadbolt 2*b* is accommodated in the accommodation portion 3*b* and the door 2 is locked.

The gear train 12 includes a clutch mechanism (not illustrated). This clutch mechanism transmits the rotation of the motor 11 to the operation knob 7, but does not transmit the manual rotation of the operation knob 7 to the motor 11.

With reference to FIG. 4, the casing 5 includes a control portion 13, and three types of switches, that is, a manual rotation switch 14, a potential sensor 15 (position detection portion), and a magnetic sensor 16. The operation portion 5*b* of the casing 5 is provided with an LED light 17 (display portion by visual display), and the casing 5 accommodates a buzzer 18 (display portion by sound).

The control portion 13 controls the motor 11, the LED light 17, and the buzzer 18 based on inputs from the manual rotation switch 14, the potential sensor 15, and the magnetic sensor 16. The control portion 13 includes a calculation portion 21, an input/output portion 22, a storage portion 23, and a timer 24. The calculation portion 21 performs calculation based on inputs from the manual rotation switch 14, the potential sensor 15, and the magnetic sensor 16 input via the input/output portion 22 with reference to the storage portion 23 and the timer 24, and outputs a command to the motor 11, the LED light 17, and the buzzer 18 via the input/output portion 22. In particular, the control portion 13 outputs, to the motor 11, a command to operate the operation knob 7 in the rotation direction and rotation time such that the operation knob 7 is in the "unlock position" or the "lock position". The control portion 13 is constructed by hardware such as a CPU, a RAM, and a ROM, and software mounted thereon.

The manual rotation switch 14 detects manual rotation of the operation knob 7. When this detection signal is input, the control portion 13 is activated regarding self-lock temporary stop control described later at the time of manual operation.

The potential sensor 15 detects a rotation angle position of the operation knob 7. The control portion 13 detects the rotation angle position based on an analog voltage signal input from the potential sensor 15, and judges which of the “unlock position”, the “lock position”, and the “neutral position” the operation knob 7 is in. In other words, the potential sensor 15 detects which of the “unlock position”, the “lock position”, and the “neutral position” the operation knob 7 is positioned.

The magnetic sensor 16 detects magnetic force from a magnet installed on the door frame 3 of the door 2. Based on an input from the magnetic sensor 16 that varies depending on the open or close state of the door 2, the control portion 13 judges whether or not the door 2 is in the close state.

The control portion 13 can execute self-lock control. In the self-lock control, the control portion 13 rotates the motor 11 in an orientation in which the operation knob 7 is in the “lock position” in a case where it is detected that the door 2 transitions from the open state to the close state of the door based on an input from the magnetic sensor 16 and the close state of the door 2 has continued for a predetermined time, and the operation knob 7 is in the “unlock position” from the input from the potential sensor 15 (when the door 2 is unlocked), or in a case where although it is detected that the operation knob 7 has been displaced from the “lock position” to the “unlock position” from the input from the potential sensor 15, the input from the magnetic sensor 16 remains in the close state of the door and is not displaced and has continued for a predetermined time. Due to this, the thumb turn 2*c* rotates via the thumb turn holder 6, the deadbolt 2*b* protrudes from the door 2 and is accommodated in the accommodation portion 3*b*, and the door 2 is locked.

The control portion 13 can execute self-lock temporary stop control for temporarily stopping the self-lock control. In the self-lock temporary stop control, even if the close state of the door 2 continues for a predetermined time, the control portion 13 does not execute locking by the motor 11.

Figure 6:
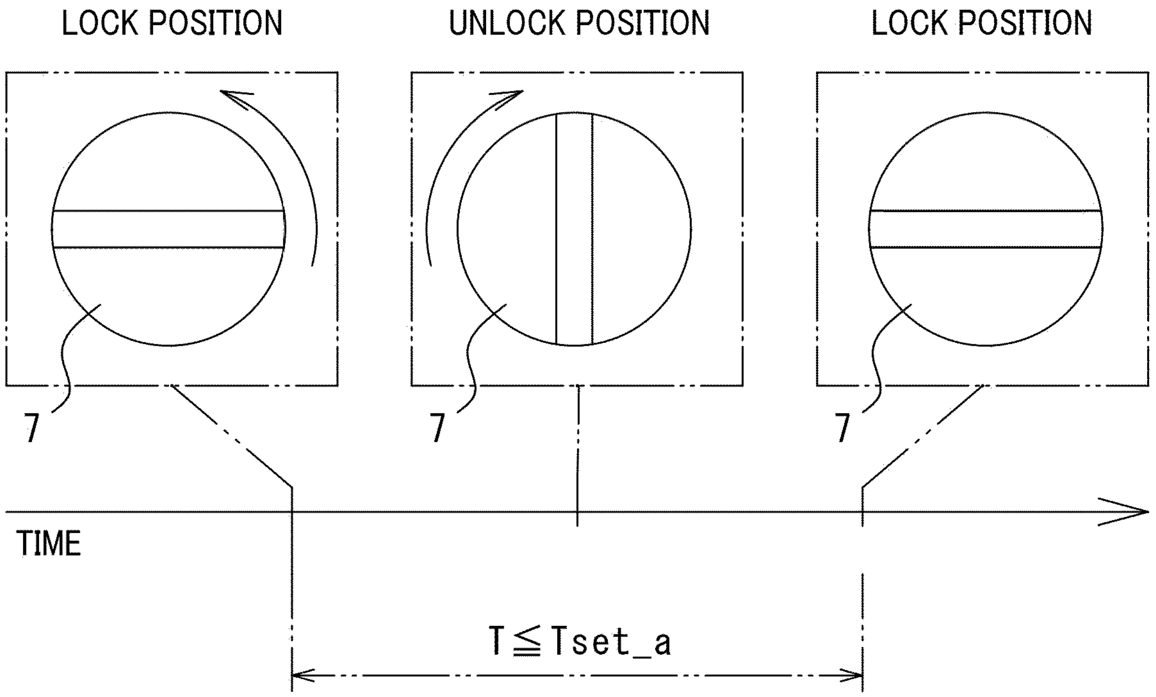
FIG. 6 is a conceptual diagram for explaining an operation of the operation knob for self-lock temporary stop control in the first embodiment of the present invention.

Switching from the self-lock control to the self-lock temporary stop control is executed by the user performing a predetermined certain operation on the operation knob 7. FIG. 6 shows an outline of the operation of the operation knob 7 for switching from the self-lock control to the self-lock temporary stop control in the present embodiment. Namely, when the operation knob 7 is operated from the “lock position” to the “unlock position” within a set time Tset_a (first set time) and is operated to the “lock position” again, the control is switched from the self-lock control to the self-lock temporary stop control.

Figure 7A:
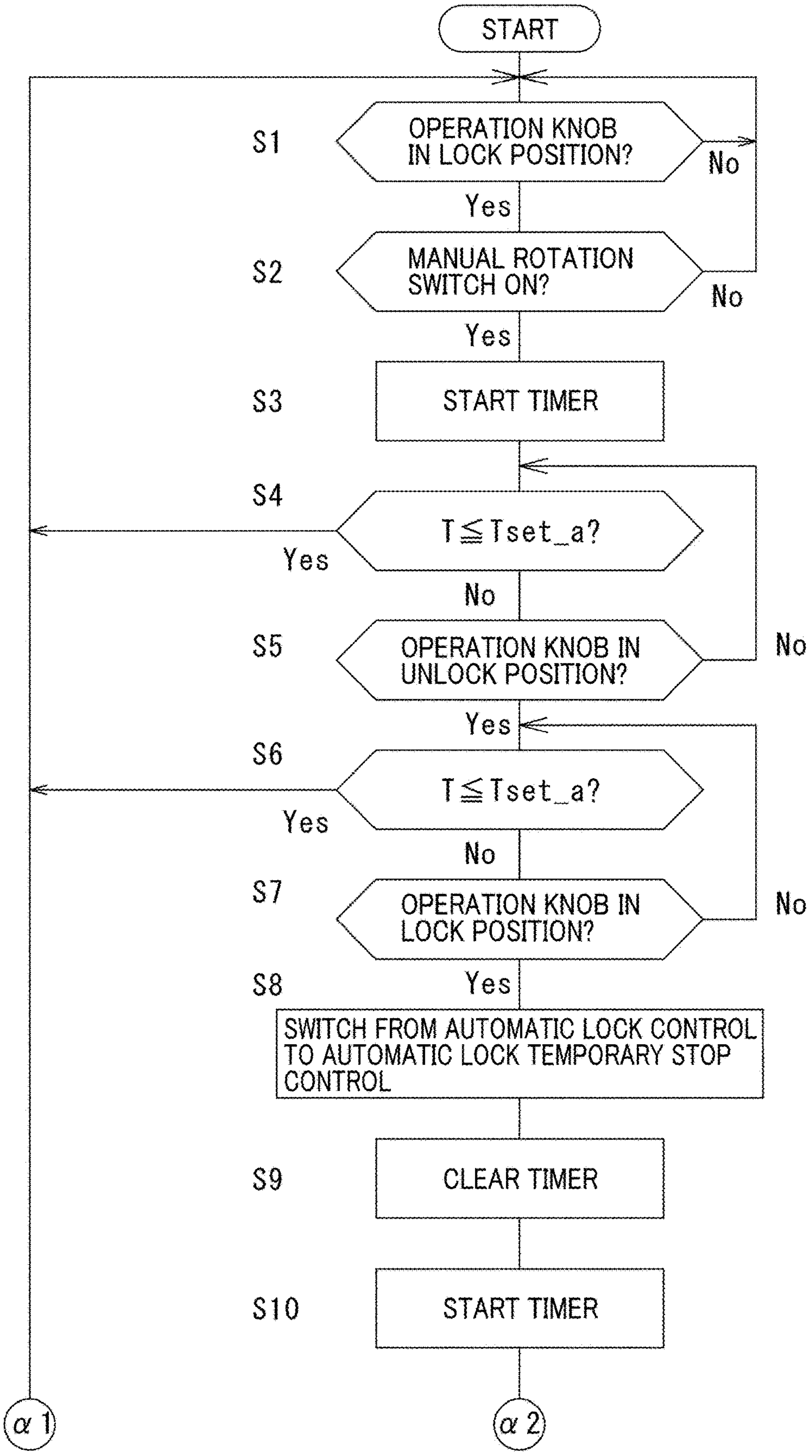
FIG. 7A is a flowchart for explaining control related to the self-lock temporary stop control of the electronic lock device according to the first embodiment of the present invention.
Figure 7B:
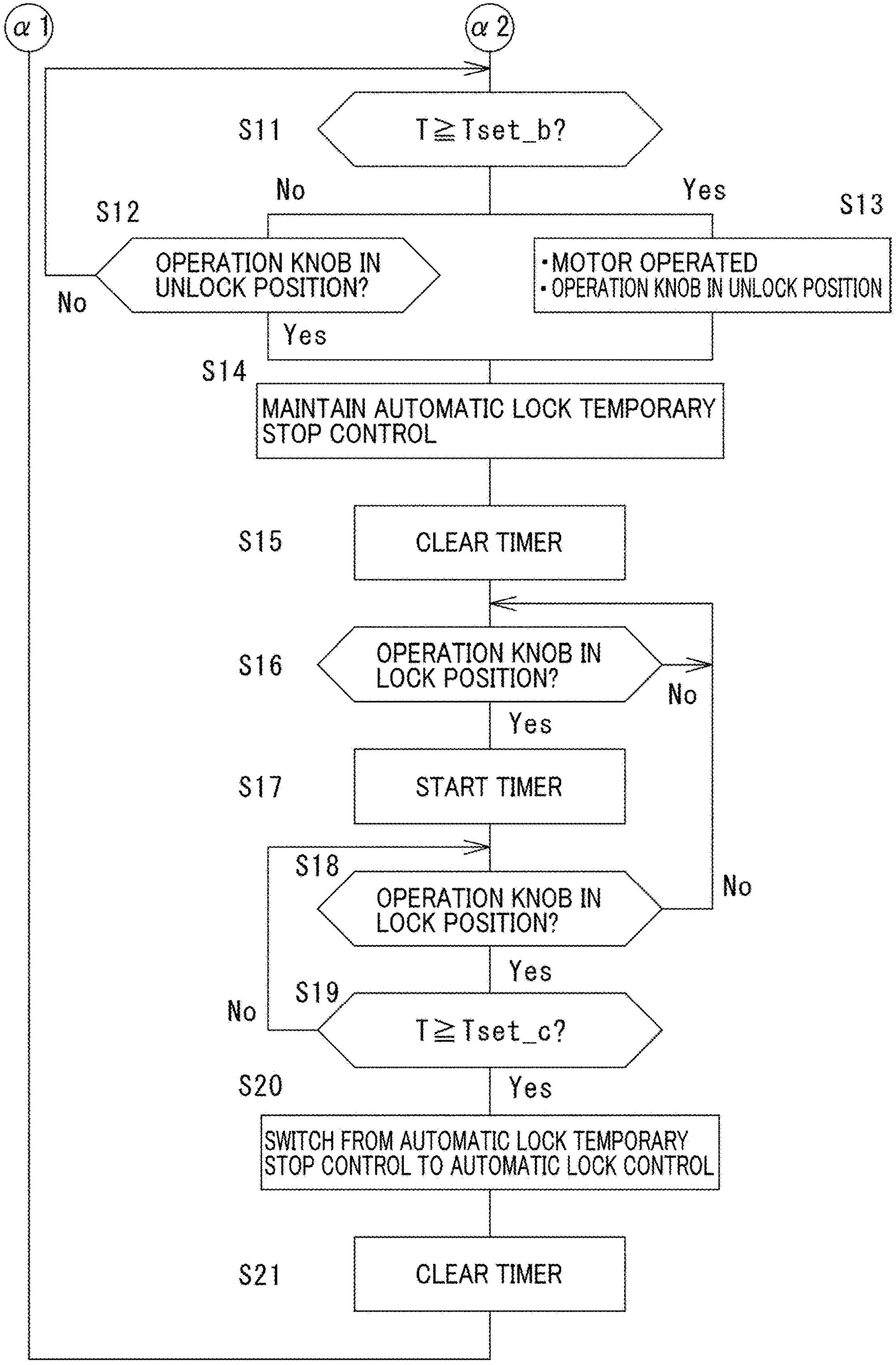
FIG. 7B is a flowchart for explaining control related to the self-lock temporary stop control of the electronic lock device according to the first embodiment of the present invention.

With reference to FIGS. 7A and 7B, the control related to the self-lock temporary stop control executed by the control portion 13 in the present embodiment will be described.

It is determined whether or not the operation knob 7 is in the “lock position” in step S1 and the operation knob 7 is operated in step S2 and the manual rotation switch 14 is on (or whether or not to be out of the “lock position”). Then, when the manual rotation switch 14 is on (or detected to have been out of the “lock position”), the timer 24 is started in step S3. When it is detected that the operation knob 7 becomes in the “unlock position” in step S5 before the time measured by the timer 24 reaches the set time Tset_a, the timer is continued as it is. When it is not detected that the operation knob 7 becomes in the “unlock position” before the time measured by the timer 24 reaches the set time Tset_a, the process returns to step S1. Furthermore, when it is not detected that the operation knob 7 becomes in the “lock position” before the time measured by the timer 24 reaches the set time Tset_a in steps S6 and S7, the process returns to step S1. On the other hand, when it is detected that the operation knob 7 has returned to the “lock position” within the set time Tset_a in steps S6 and S7, the self-lock control is switched to the self-lock temporary stop control in step S8. At the time of this switching, the user is notified of the switching by at least one of sound by drive of the buzzer 18 and visual display by drive of the LED light 17. In steps S9 and S10, the timer 24 is cleared once, and then the timer 24 is started again.

Next, in step S11, if the time measured by the timer 24 is less than a set time Tset_b (third set time), the process proceeds to step S12. If it is detected that the operation knob 7 is in the “unlock position” in step S12, that is, if the operation knob 7 is operated from the “lock position” to the “unlock position” by the user, the process proceeds to step S14 to maintain the self-lock temporary stop control, and the timer 24 is cleared in step S15. If it is not detected that the operation knob 7 is in the “unlock position” in step S12, the process returns to step S11.

On the other hand, if the time measured by the timer 24 is equal to or greater than the set time Tset_b (third set time) in step S11, the process proceeds to step S13. In step S13, the motor 11 is operated. The motor 11 rotates the operation knob 11 from the “lock position” to the “unlock position”, and causes the thumb turn 2*e* to unlock the door 2 via the thumb turn holder 6. Thereafter, the process proceeds to steps S14 and S15.

The control in steps S11 to S15 is as follows in short. First, when the set time Tset_b (third set time) elapses from the switching from the self-lock control to the self-lock temporary stop control, the motor 11 drives the thumb turn holder 6 to cause the thumb turn 2*e* to unlock the door 2, and continues the self-lock temporary stop control with the operation knob 7 being in the “unlock position”. On the other hand, even if it is detected that the operation knob 7 is operated from the “lock position” to the “unlock position” based on an input from the potential sensor 15 before the set time Tset_b (third set time) is reached since the switching from the self-lock control to the self-lock temporary stop control, the self-lock temporary stop control is continued.

Next, if it is detected that the operation knob 7 is in the “lock position” in step S16, that is, if it is detected that the operation knob 7 is operated from the “unlock position” to the “lock position” by the user, the timer 24 starts in step S17. When it is detected that the operation knob 7 is not in the “lock position”, that is, the operation knob 7 is operated by the user from the “lock position” before the time measured by the timer 24 reaches a set time Tset_c (fourth set time) as in steps S18 and S19, the process returns to step S16. On the other hand, when the time measured by the timer 24 becomes equal to or greater than the set time Tset_c (fourth set time), the self-lock temporary stop control is switched to the self-lock control in step S20. At the time of this switching, the user is notified of the switching by at least one of sound by drive of the buzzer 18 and visual display by drive of the LED light 17. Thereafter, after the timer 24 is cleared in step S19, the process returns to step S1.

The control in steps S16 to S20 is as follows in short. That is, when it is detected that the operation knob 7 is in the “lock position” for equal to or greater than the set time Tset_c (fourth set time) based on an input from the potential sensor 15 during execution of the self-lock temporary stop control, the self-lock temporary stop control is switched to the self-lock control.

Figure 8:
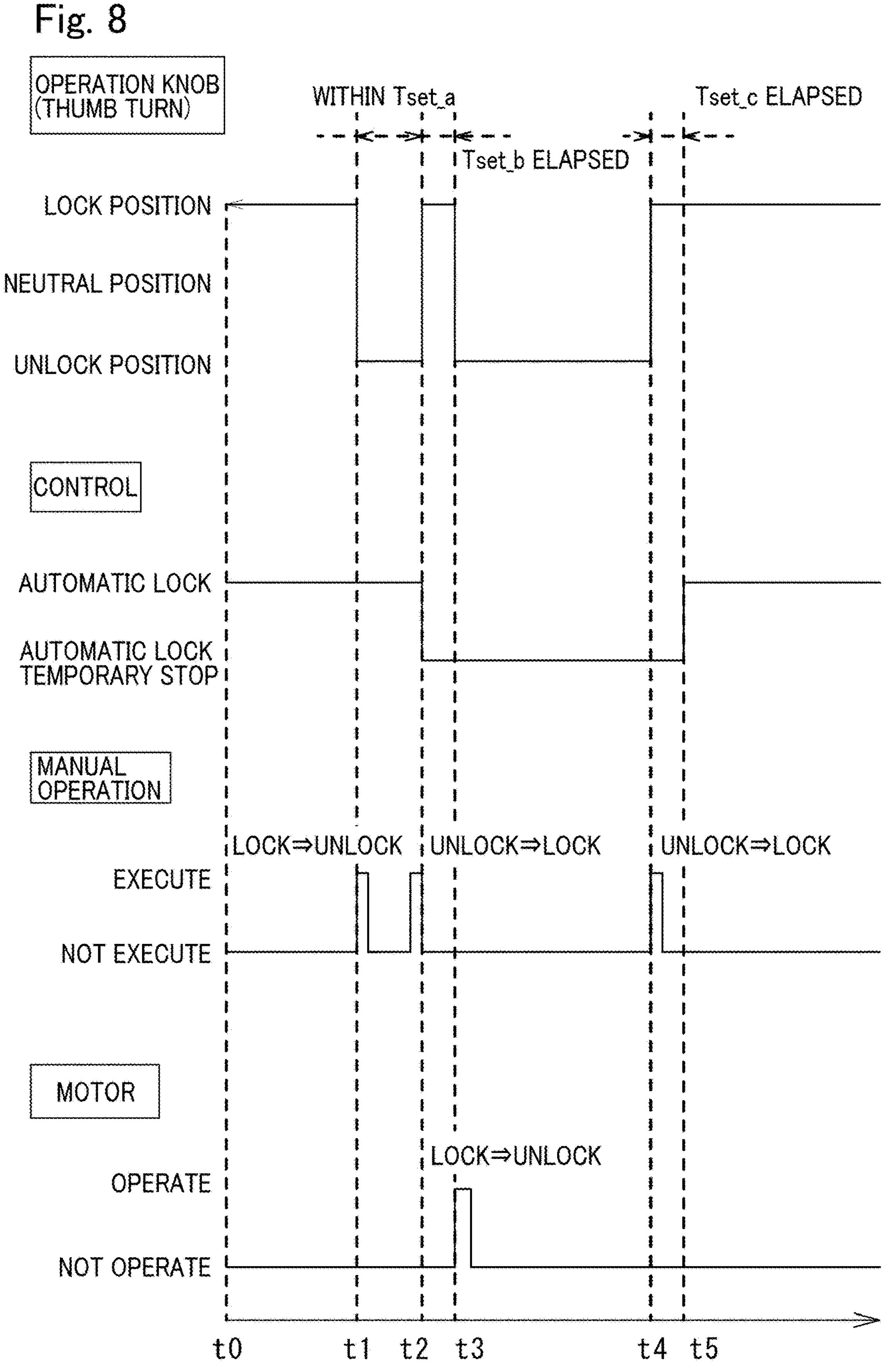
FIG. 8 is a time chart showing an example of an operation related to self-lock temporary stop control of the electronic lock device according to the first embodiment of the present invention.

FIG. 8 shows an example of an operation related to the self-lock temporary stop control of the electronic lock device 1 according to the present embodiment.

From time t0 to before time t1, the operation knob 7 is in the "lock position", but the operation knob 7 is operated by the user from the "lock position" to the "unlock position" at time t1, and further operated from the "unlock position" to the "lock position" again at time t2. If the time from time t2 (operation to the "unlock position") to time t2 (operation to the "lock position") is within the set time Tset_a (first set time), the self-lock control is switched to the self-lock temporary stop control at time t2. At time t3 after the set time Tset_b (third set time) has elapsed from time t2, the motor 11 rotates the operation knob 7 and the thumb turn 2*e* from the "lock position" to the "unlock position".

Thereafter, when the user operates the operation knob 7 from the "unlock position" to the "lock position" at time t4, the self-lock temporary stop control is switched to the self-lock control at time t5 when the set time Tsee_c (fourth set time) is reached.

Figure 9:
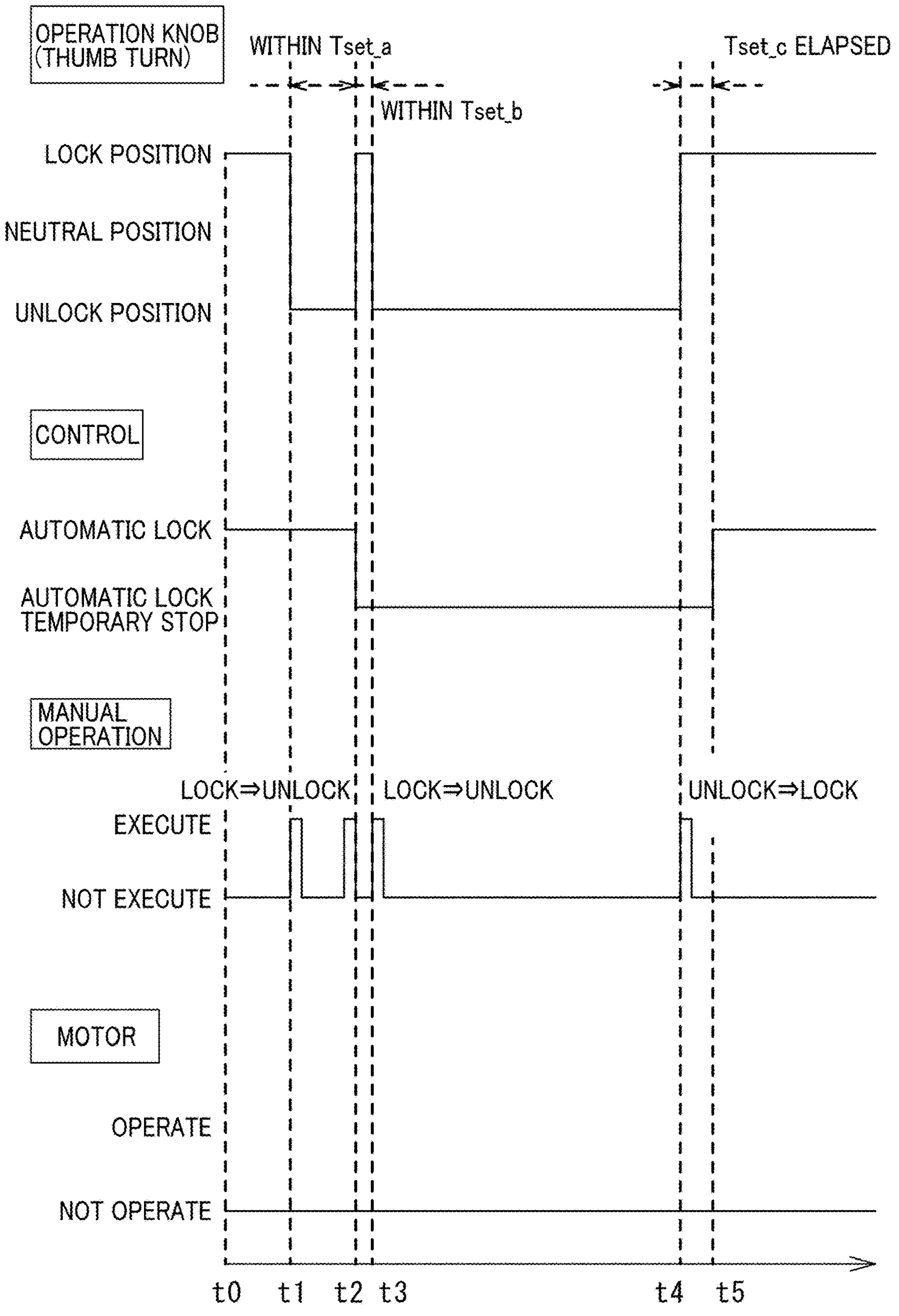
FIG. 9 is a time chart showing another example of an operation related to self-lock temporary stop control of the electronic lock device according to the first embodiment of the present invention.

FIG. 9 shows another example of the operation related to the self-lock temporary stop control of the electronic lock device 1 according to the present embodiment.

In this example, after the operation knob 7 is operated by the user to switch from the self-lock control to the self-lock temporary stop control at time t2, the user operates the operation knob 7 from the "lock position" to the "unlock position" at time t3 within the set time Tset_b (third set time), but the self-lock temporary stop control is maintained. The rest (time t0 to t2, t4 to t5) of the example of FIG. 9 is similar to the example of FIG. 8 described above.

According to the electronic lock device 1 of the present embodiment, the operation knob 7 is operated from the "lock position" to the "unlock position" within a certain period of time (within the set time Tset_a), and is operated to the "lock position" again, whereby the self-lock control can be switched to the self-lock temporary stop control. Switching to the self-lock temporary stop control is performed only by returning the operation knob 7 to the original "lock position" from the position at the time of operation start for switching to the self-lock temporary stop control, that is, from the "lock position" to the "unlock position" within a certain period of time (within the set time Tset_a). Therefore, it is possible to prevent the user from further operating the operation knob 7 contrary to the original intention, thereby preventing the switching to the self-lock temporary stop control from being performed. That is, it is possible to reduce the possibility that the user erroneously operates the operation knob 7 contrary to the original intention.

Since the self-lock control can be switched to the self-lock temporary stop control only by operating the operation knob 7 twice, the user does not need to memorize the number of times of operation of three or more times of the operation knob 7. In this respect, it is possible to improve the operability of operation of the operation knob 7 required for switching to the self-lock temporary stop control.

Hereinafter, the second to fifth embodiments of the present invention will be described. These embodiments are different only in the control executed by the control portion 13. Therefore, the configuration of the electronic lock device 1 of these embodiments is similar to that of the first embodiment described with reference to FIGS. 1 to 4. In the following description, identical references are used for identical elements as those of the first embodiment.

Second Embodiment

Figure 10:
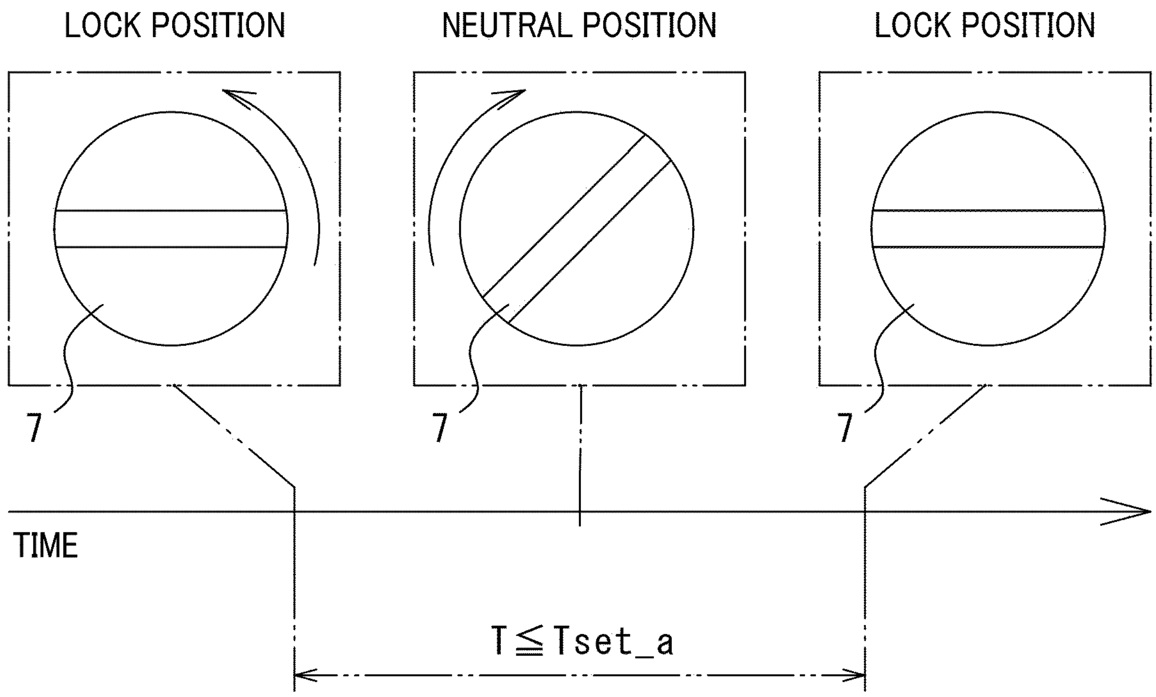
FIG. 10 is a conceptual diagram for explaining an operation of the operation knob for self-lock temporary stop control in a second embodiment of the present invention.

FIG. 10 shows an outline of the operation of the operation knob 7 for switching from the self-lock control to the self-lock temporary stop control in the second embodiment. Namely, when the operation knob 7 is operated from the "lock position" to the "neutral position" within a set time Tset_a (second set time) and is operated to the "lock position" again, the control is switched from the self-lock control to the self-lock temporary stop control.

Figure 11A:
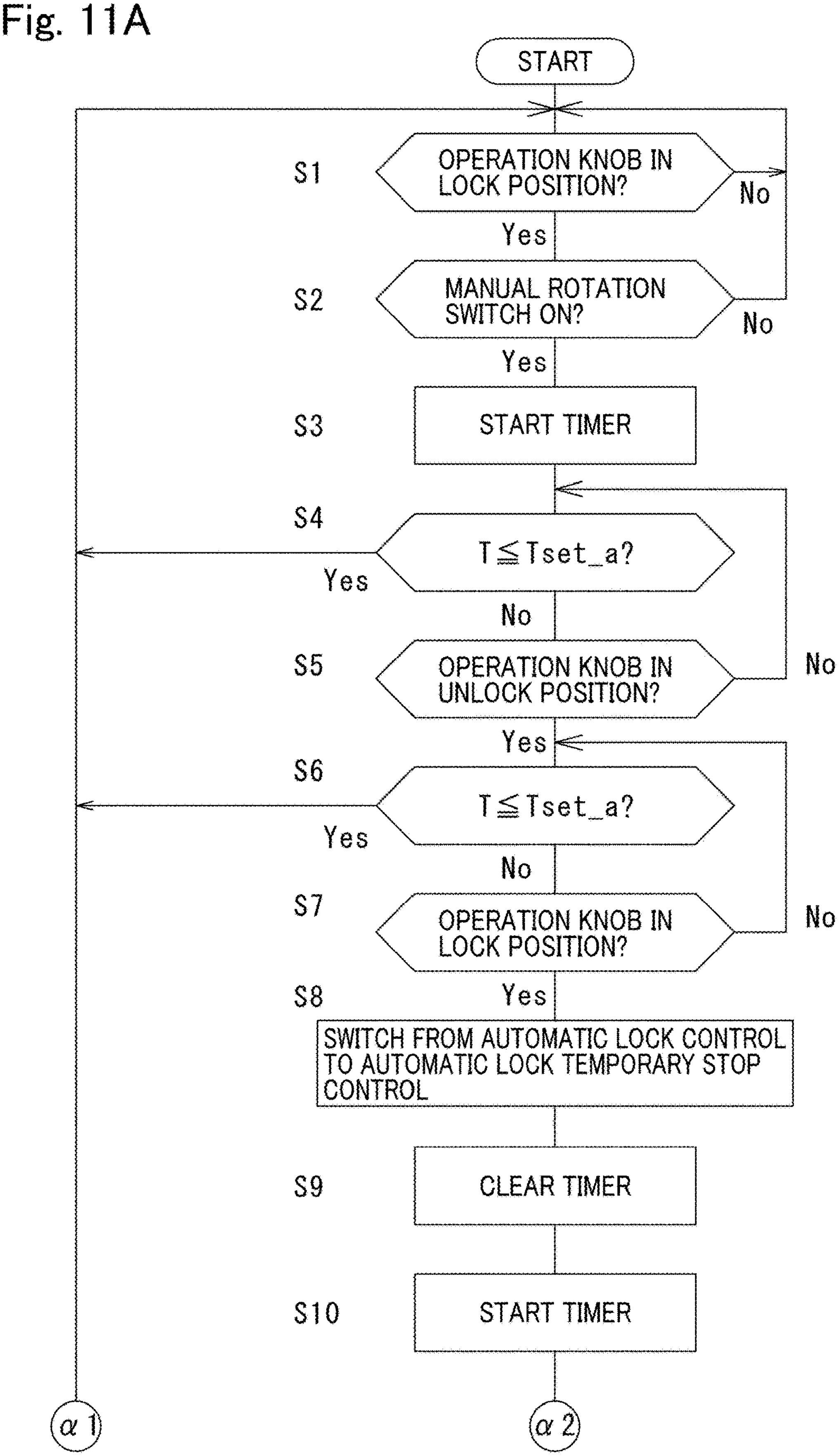
FIG. 11A is a flowchart for explaining control related to the self-lock temporary stop control of the electronic lock device according to the second embodiment of the present invention.
Figure 11B:
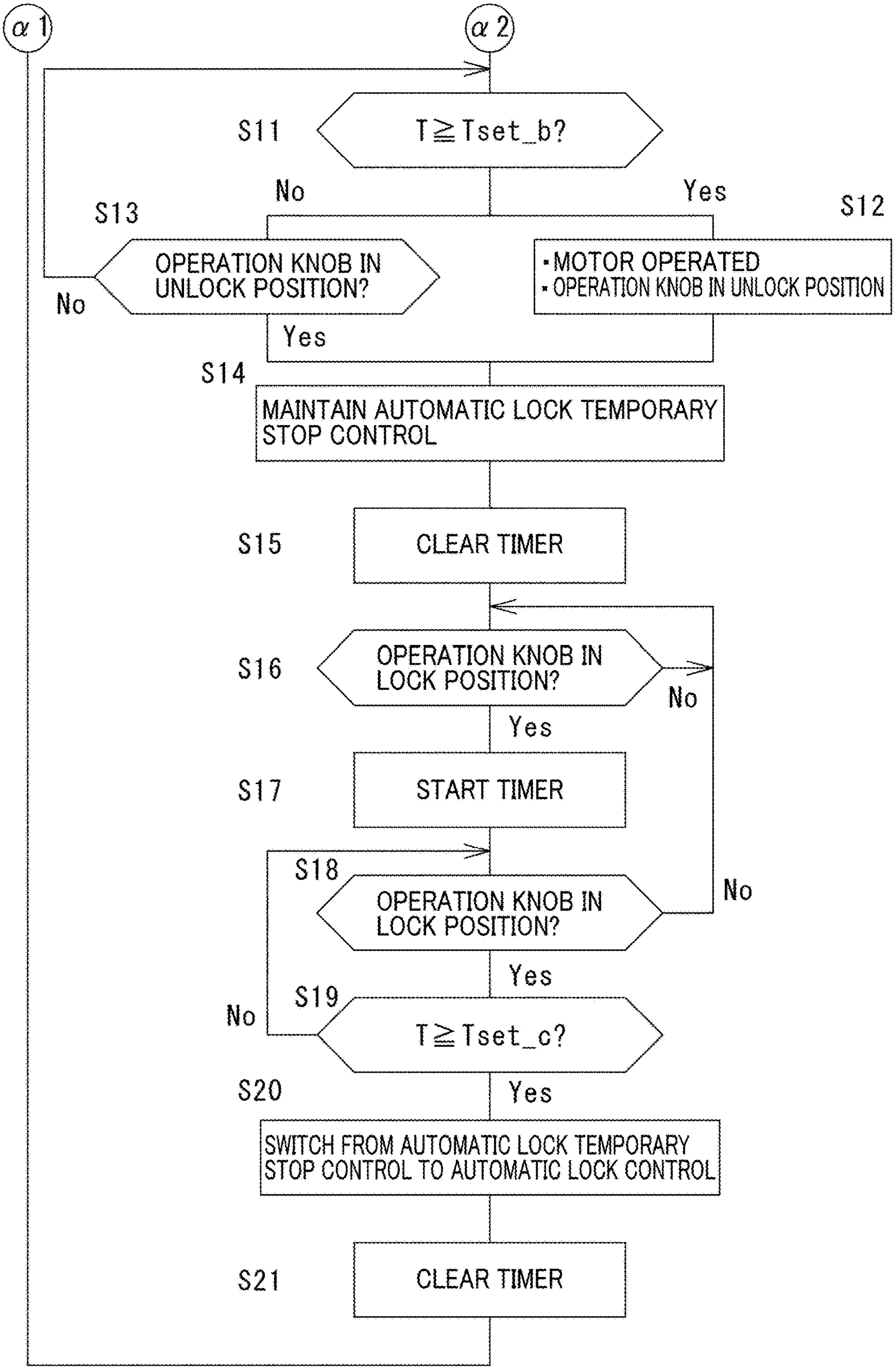
FIG. 11B is a flowchart for explaining control related to the self-lock temporary stop control of the electronic lock device according to the second embodiment of the present invention.

The control related to the self-lock temporary stop control executed by the control portion 13 in the present embodiment shown in FIGS. 11A and 11B is similar to that in the first embodiment (FIGS. 7A and 7B) except that it is judged whether or not the operation knob 7 is in the "neutral position" in step S5.

According to the electronic lock device 1 of the present embodiment, it is determined whether or not the operation knob 7 is operated in step S2 and the manual rotation switch 14 is on (or whether or not to be out of the "lock position"). Then, the manual rotation switch 14 is on (or detected to be out of the "lock position"), and the timer 24 is started in step S3. When it is detected that the operation knob 7 is in the "neutral position" in step S5 before the time measured by the timer 24 reaches the set time Tset_a, the timer is continued as it is. When it is not detected that the operation knob 7 becomes in the "neutral position" and further from the "neutral position" to the "lock position" before the time measured by the timer 24 reaches the set time Tset_a, the process returns to step S1. That is, since switching to the self-lock temporary stop control can be performed only by returning the operation knob 7 from the "lock position" to the "neutral position" to the original "lock position" within a certain period of time (within the set time Tset_a), it is possible to reduce the possibility that the user erroneously operates the operation knob 7 contrary to the original intention.

Since it is possible to switch from the self-lock control to the self-lock temporary stop control only by operating the operation knob 7 twice, it is possible to improve the operability of operation of the operation knob 7 required for switching to the self-lock temporary stop control.

Third Embodiment

Figure 12:
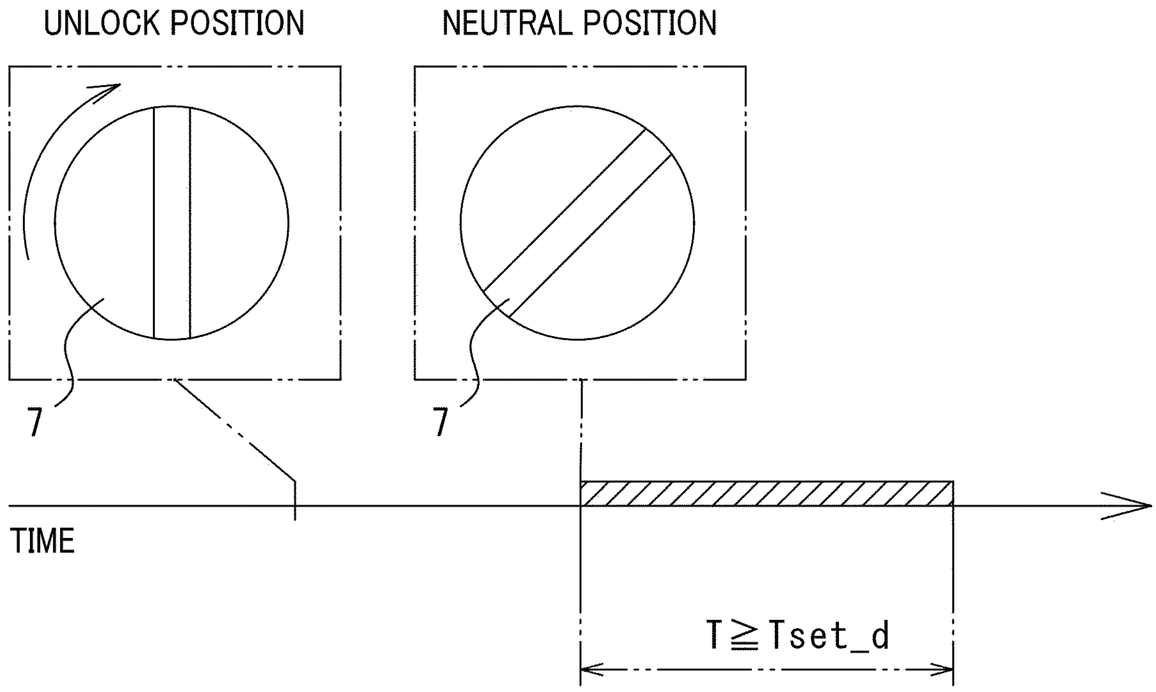
FIG. 12 is a conceptual diagram for explaining an operation of the operation knob for self-lock temporary stop control of an electronic lock device according to a third embodiment of the present invention.

FIG. 12 shows an outline of the operation of the operation knob 7 for switching from the self-lock control to the self-lock temporary stop control in the third embodiment. That is, when the operation knob 7 is operated from the "unlock position" to the "neutral position" and is maintained in the "neutral position" for a set time Tset_d (fifth set time), the self-lock control is switched to the self-lock temporary stop control.

Figure 13:
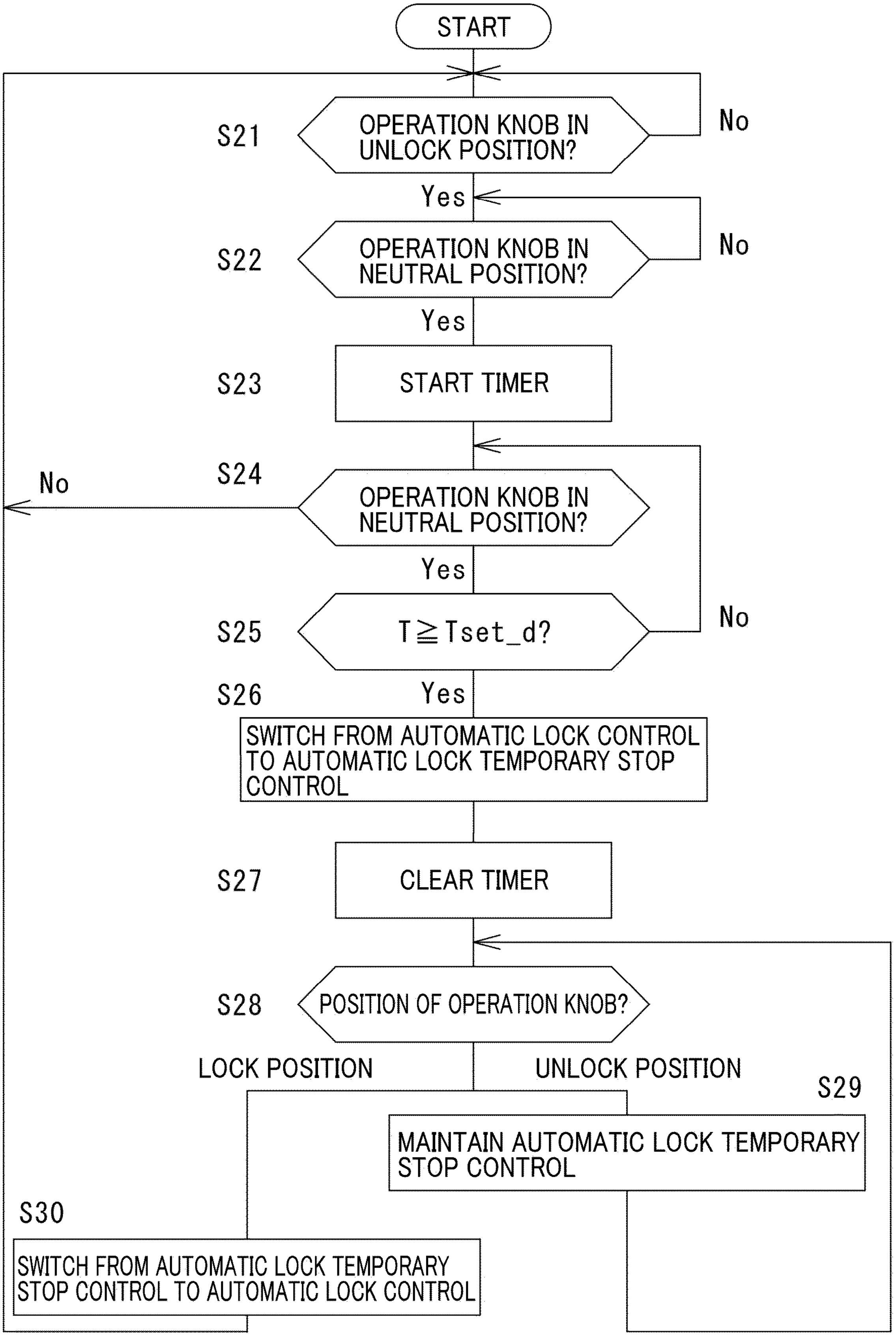
FIG. 13 is a flowchart for explaining control related to the self-lock temporary stop control of the electronic lock device according to the third embodiment of the present invention.

With reference to FIG. 13, the control related to the self-lock temporary stop control executed by the control portion 13 in the present embodiment will be described.

When it is detected that the operation knob 7 is in the "unlock position" in step S21 and the operation knob 7 is in the "neutral position" in step S22, that is, when the operation knob 7 is operated from the "unlock position" to the "neutral position" by the user, the timer 24 starts in step S23. When it is detected that the operation knob 7 is operated to a position other than the "neutral position" ("unlock position" or "lock position") before the time measured by the timer 24 reaches the set time Tset_d (the fifth set time) in steps S24 and 25, that is, when the operation knob 7 is operated by the user to a position other than the "neutral position", the process returns to step S21. On the other hand, when the time measured by the timer 24 becomes equal to or greater than the set time Tset_d (fifth set time) in steps S24 and S25, that is, when it is detected that the operation knob 7 is maintained in the "neutral position" for equal to or greater than the set time Tset_d (fifth set time), the self-lock control is switched to the self-lock temporary stop control in step S26. At the time of this switching, the user is notified of the switching by at least one of sound by drive of the buzzer 18 and visual display by drive of the LED light 17. In step S27, the timer 24 is cleared.

Next, when the position of the operation knob 7 is the "unlock position" in step S28, that is, when it is detected that the operation knob 7 is operated to the "unlock position" by the user, the self-lock temporary stop control is maintained in step S29, and the process returns to step S28. On the other hand, when the position of the operation knob 7 is the "lock position" in step S28, that is, when it is detected that the operation knob 7 is operated to the "lock position" by the user, the self-lock temporary stop control is switched to the self-lock control in step S30, and the process returns to step S21. At the time of switching, the user is notified of the switching by at least one of sound by drive of the buzzer 18 and visual display by drive of the LED light 17.

In place of the control from step S28 to step S30, the control from step S14 to step S18 of the first embodiment (FIG. 7B) may be adopted. In this respect, the same applies to the fourth embodiment described later. In place of the control from step S14 to step S18 in the first and second embodiments, the control from step S28 to step S30 in the present embodiment may be adopted.

Figure 14:
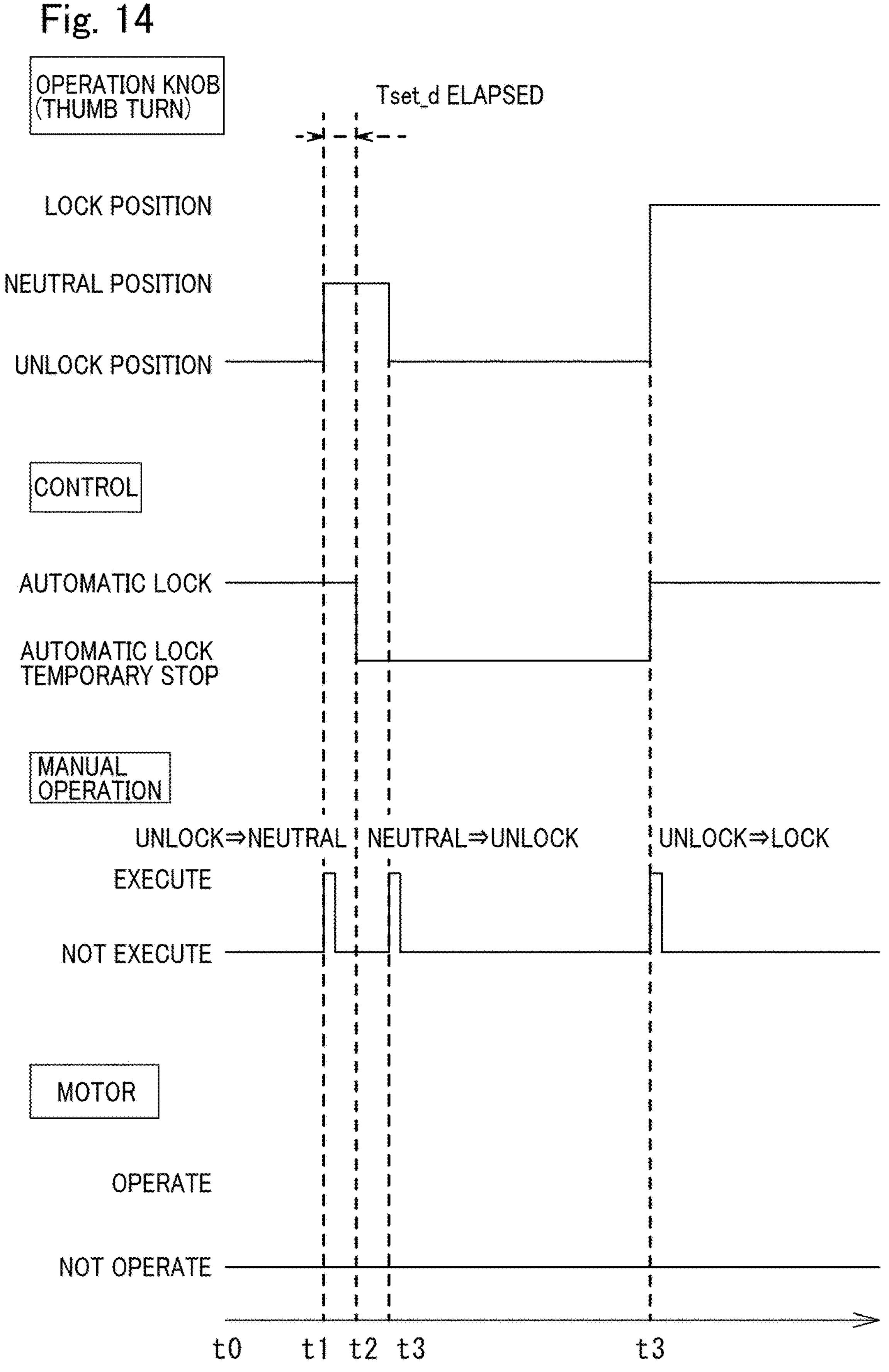
FIG. 14 is a time chart showing an example of an operation related to self-lock temporary stop control of the electronic lock device according to the third embodiment of the present invention.

FIG. 14 shows an example of an operation related to the self-lock temporary stop control of the electronic lock device 1 according to the present embodiment.

From time t0 to before time t1, the operation knob 7 is in the "unlock position", but the operation knob 7 is operated by the user from the "unlock position" to the "neutral position" at time t1. At time t2 when the operation knob 7 reaches the set time Tset_d (fifth set time) after the "neutral position", the self-lock control is switched to the self-lock temporary stop control. Thereafter, even when the user operates the operation knob 7 from the "neutral position" to the "unlock position" at time t3, the self-lock temporary stop control is performed. When the user operates the operation knob 7 from the "unlock position" to the "lock position" at time t3, the self-lock temporary stop control is switched to the self-lock control.

According to the electronic locking device 1 of the present embodiment, the operation knob 7 is operated from the "unlock position" to the "neutral position" and held for a certain period of time (set time Tset_d), whereby the self-lock control can be switched to the self-lock temporary stop control. Therefore, it is possible to prevent the user from further operating the operation knob 7 contrary to the original intention, thereby preventing the switching to the self-lock temporary stop control from being performed. That is, it is possible to reduce the possibility that the user erroneously operates the manual operation portion contrary to the original intention.

Since the self-lock control can be switched to the self-lock temporary stop control only by operating the operation knob 7 once, the user does not need to memorize the number of times of operation of the operation knob 7. In this respect, it is possible to improve the operability of operation of the operation knob 7 required for switching to the self-lock temporary stop control.

Fourth Embodiment

Figure 15:
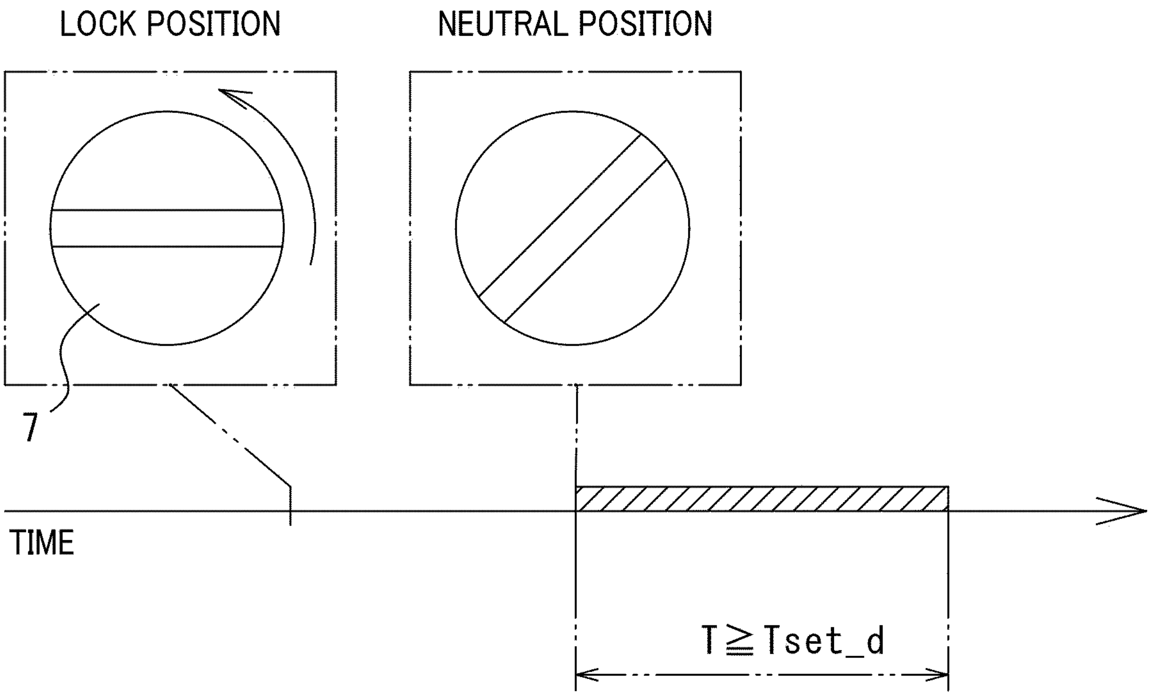
FIG. 15 is a conceptual diagram for explaining an operation of the operation knob for self-lock temporary stop control of an electronic lock device according to a fourth embodiment of the present invention.

FIG. 15 shows an outline of the operation of the operation knob 7 for switching from the self-lock control to the self-lock temporary stop control in the fourth embodiment. That is, when the operation knob 7 is operated from the "lock position" to the "neutral position" and is maintained in the "neutral position" for the set time Tset_d (sixth set time), the self-lock control is switched to the self-lock temporary stop control.

Figure 16:
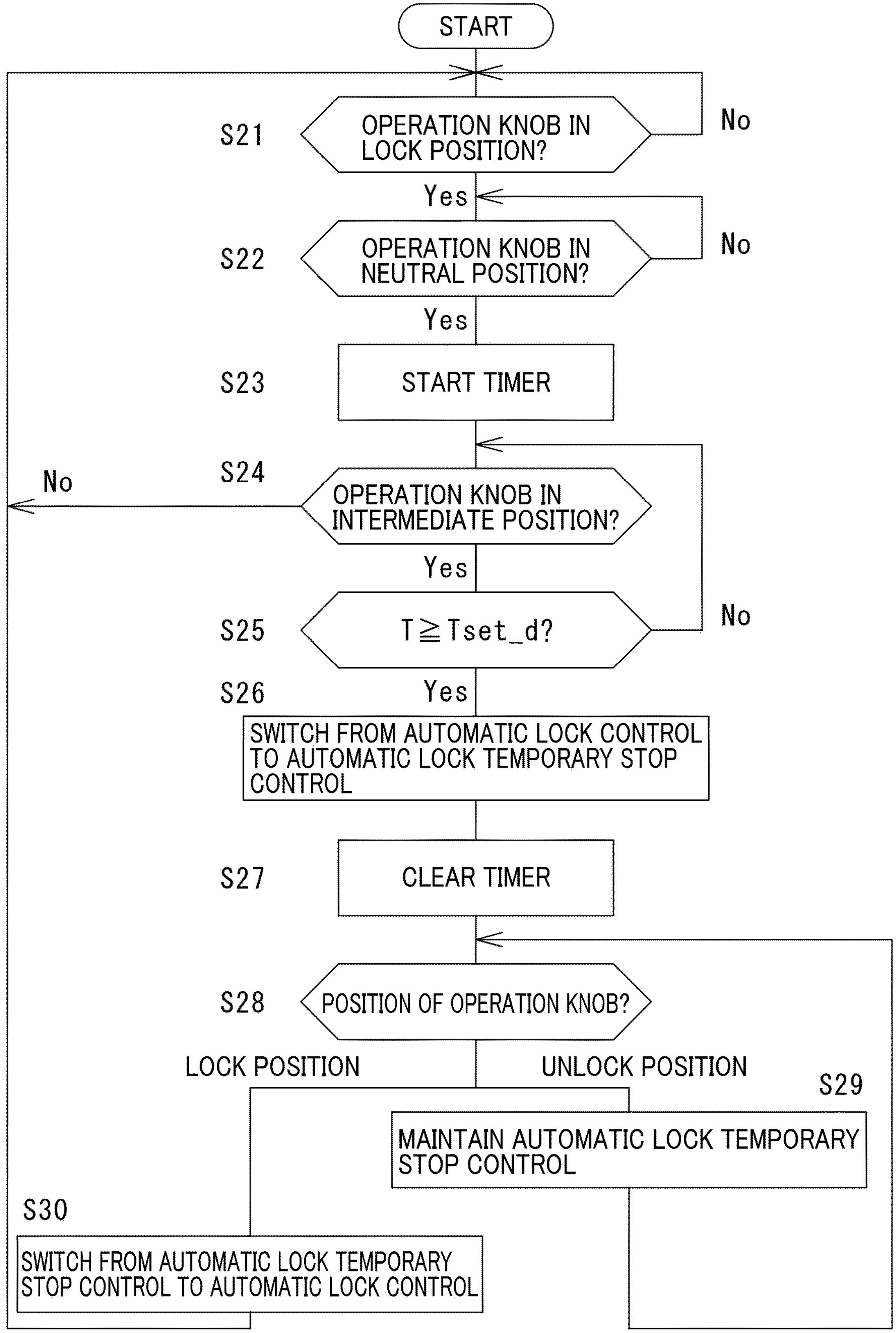
FIG. 16 is a flowchart for explaining control related to the self-lock temporary stop control of the electronic lock device according to the fourth embodiment of the present invention.

The control related to the self-lock temporary stop control executed by the control portion 13 in the present embodiment shown in FIG. 16 is similar to that in the third embodiment (FIG. 13) except that it is judged whether or not the operation knob 7 is in the "lock position" in step S21.

According to the electronic lock device 1 of the present embodiment, since the operation knob 7 is operated from the "lock position" to the "neutral position" and held for a certain period of time (set time Tset_d), whereby the self-lock control can be switched to the self-lock temporary stop control, it is possible to reduce the possibility that the user erroneously operates the operation knob 7 contrary to the original intention.

Since it is possible to switch from the self-lock control to the self-lock temporary stop control only by operating the operation knob 7 once, it is possible to improve the operability of operation of the operation knob 7 required for switching to the self-lock temporary stop control.

Fifth Embodiment

Figure 17:
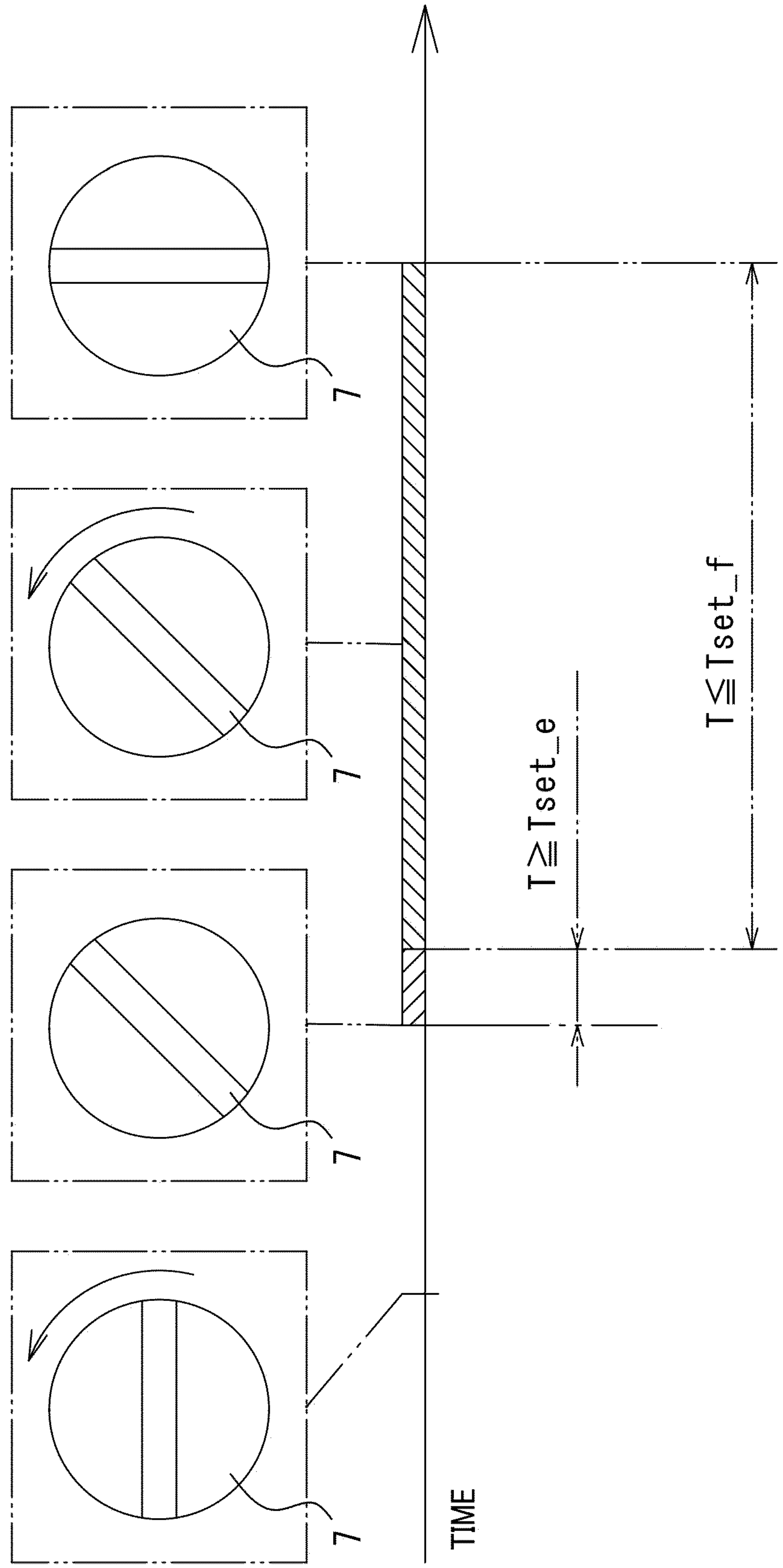
FIG. 17 is a time chart showing an example of an operation related to self-lock temporary stop control of the electronic lock device according to a fifth embodiment of the present invention.

FIG. 17 shows an outline of the operation of the operation knob 7 for switching from the self-lock control to the self-lock temporary stop control in the fifth embodiment. That is, when the operation knob 7 is operated from the "lock position" to the "neutral position" and is maintained in the "neutral position" for the set time Tset_e (sixth set time), which is, for example, 1 second, and then is operated from the "neutral position" to the "unlock position" within a set time Tset_f (seventh set time), which is, for example, 10 seconds, the self-lock control is switched to the self-lock temporary stop control.

Figure 18A:
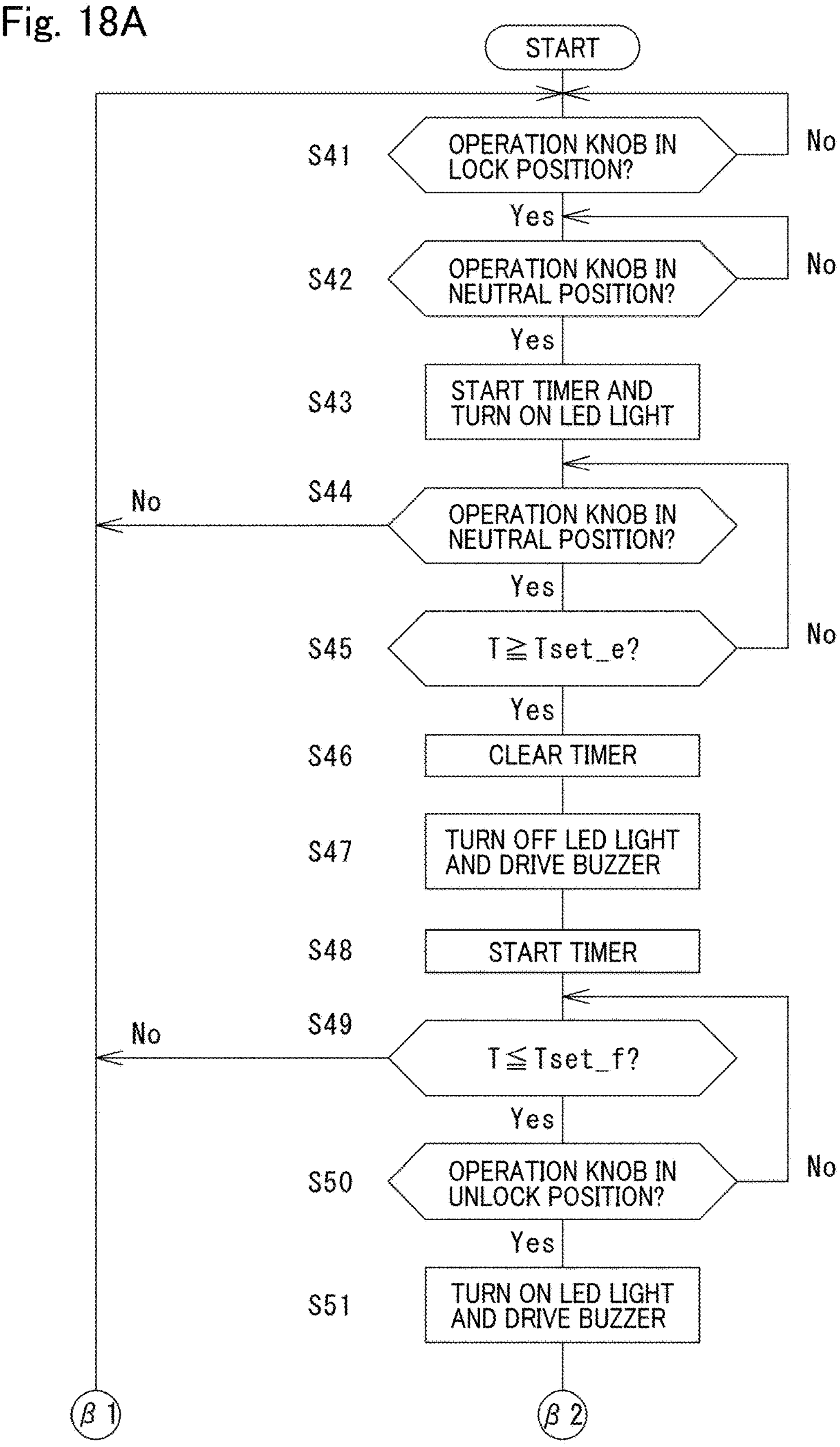
FIG. 18A is a conceptual diagram for explaining an operation of the operation knob for self-lock temporary stop control of an electronic lock device according to the fifth embodiment of the present invention.
Figure 18B:
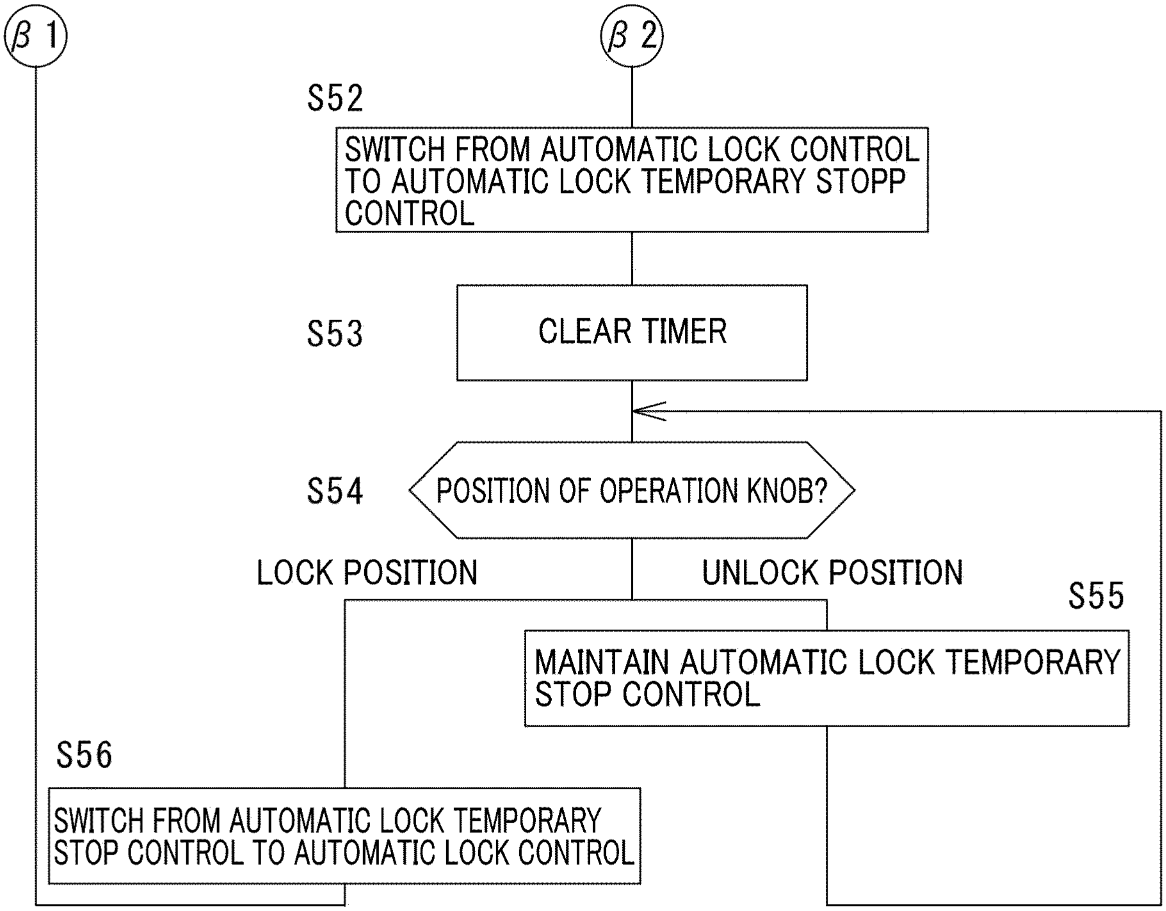
FIG. 18B is a flowchart for explaining control related to the self-lock temporary stop control of the electronic lock device according to the fifth embodiment of the present invention.

With reference to FIGS. 18A and 18B, the control related to the self-lock temporary stop control executed by the control portion 13 in the present embodiment will be described.

When it is detected that the operation knob 7 is in the "lock position" in step S41 and the operation knob 7 is in the "neutral position" in step S42, that is, when the operation knob 7 is operated from the "lock position" to the "neutral position" by the user, the timer 24 starts in step S43, and the LED light 17 is turned on to notify the user of an unstable state (the LED light 17 is turned off when, for example, 1 second elapses, and at that time, the buzzer 18 is driven). Measurement by the timer 24 is continued as it is.

When it is detected that the operation knob 7 is operated to a position other than the "neutral position" ("unlock position" or "lock position") before the time measured by the timer 24 reaches the set time Tset_e (sixth set time) in steps S44 and 45, that is, when the operation knob 7 is operated by the user to a position other than the "neutral position", the process returns to step S41. On the other hand, when the time measured by the timer 24 becomes equal to or greater than the set time Tset_e (sixth set time) in steps S44 and S45, that is, when it is detected that the operation knob 7 is maintained in the "neutral position" for equal to or greater than the set time Tset_e (sixth set time), the process proceeds to step S46. In step S46, the timer 24 is cleared once and measurement is stopped. In step S47, in order to prompt the user to operate the operation knob 7 from the "neutral position" to the "unlock position", the LED light 17 is turned off, and the buzzer 18 is driven for 1 second, for example. Furthermore, in step S48, the timer 24 starts to measurement of time.

Unless the operation knob 7 is operated from the "neutral position" to the "unlock position" within the set time Tset_f (seventh set time) of the time measured by the timer 24 in steps S49 and 50, the process returns to step S41. On the other hand, in steps S49 and 50, when the operation knob 7 is operated from the "neutral position" to the "unlock position" within the set time Tset_f (seventh set time) of the time measured by the timer 24, the process proceeds to steps S51 and 52. In step S52, the self-lock temporary stop control is switched to the self-lock control, and in step S51, turning on of the LED light 17 and driving of the buzzer 18 are executed for a predetermined time (e.g., 0.5 seconds) in order to notify the user that the self-lock temporary stop is started.

The control in steps S51 to 54 is similar to the control in steps S27 to 30 in the third embodiment (FIG. 13). In place of the control of steps S50 to 54, the control of steps S14 to 18 of the first embodiment (FIG. 7B) may be adopted. The timer 24 may measure the set time Tset_f (seventh set time) without stopping the measurement when the set time Tset_e (sixth set time) or more is reached.

Sixth Embodiment

Figure 19:
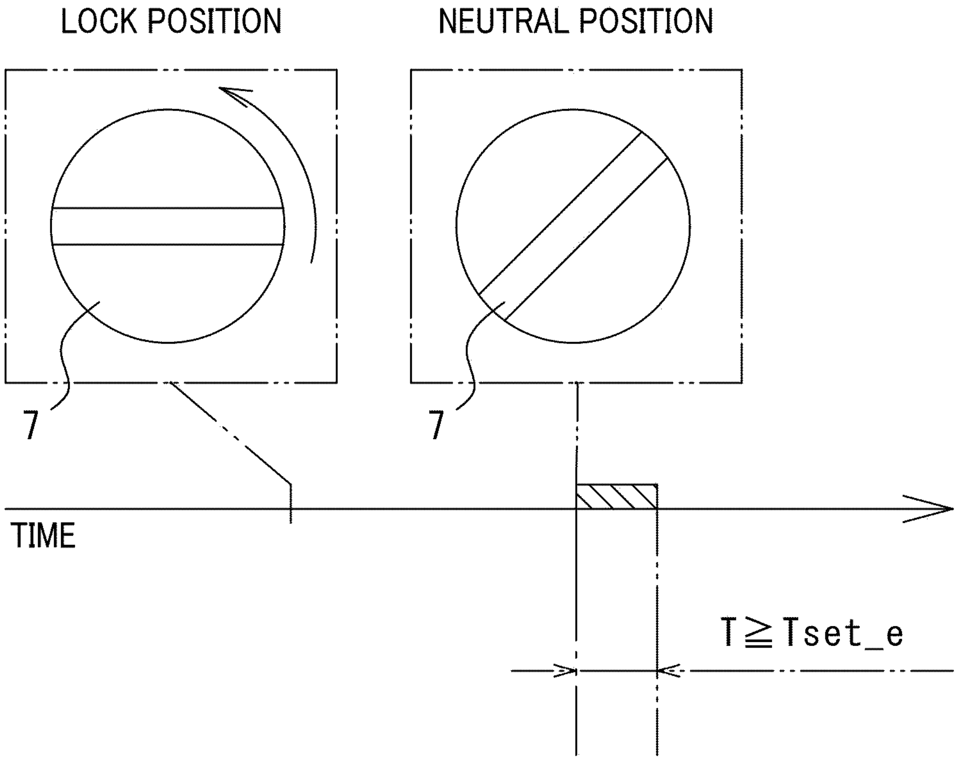
FIG. 19 is a time chart showing an example of an operation related to self-lock temporary stop control of the electronic lock device according to a sixth embodiment of the present invention.

FIG. 19 shows an outline of the operation of the operation knob 7 for switching from the self-lock control to the self-lock temporary stop control in the sixth embodiment. That is, when the operation knob 7 is operated from the "lock position" to the "neutral position" and is maintained in the "neutral position" for the set time Tset_e (sixth set time), which is, for example, 1 second, the self-lock control is switched to the self-lock temporary stop control.

Figure 20A:
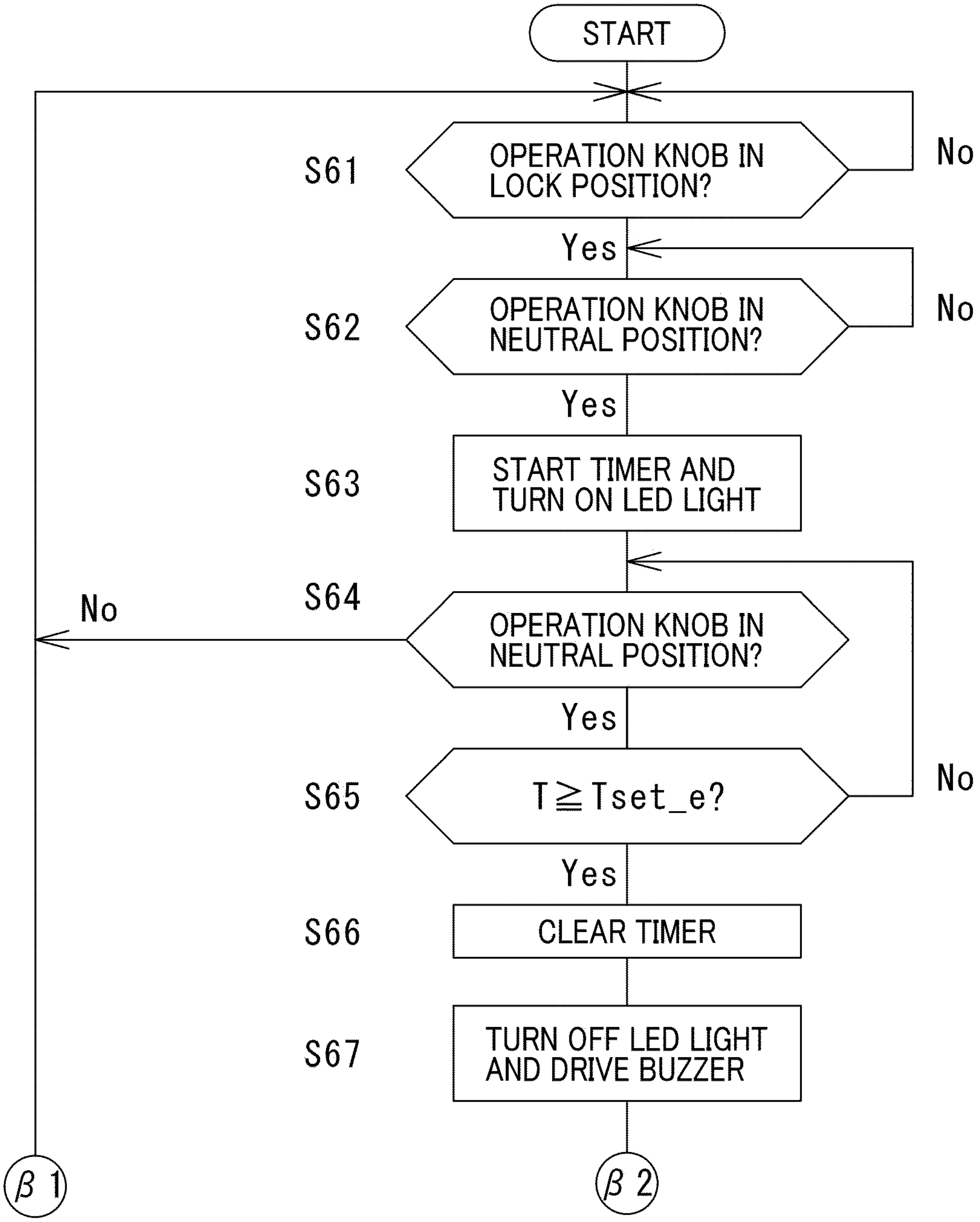
FIG. 20A is a conceptual diagram for explaining an operation of the operation knob for self-lock temporary stop control of an electronic lock device according to the sixth embodiment of the present invention.
Figure 20B:
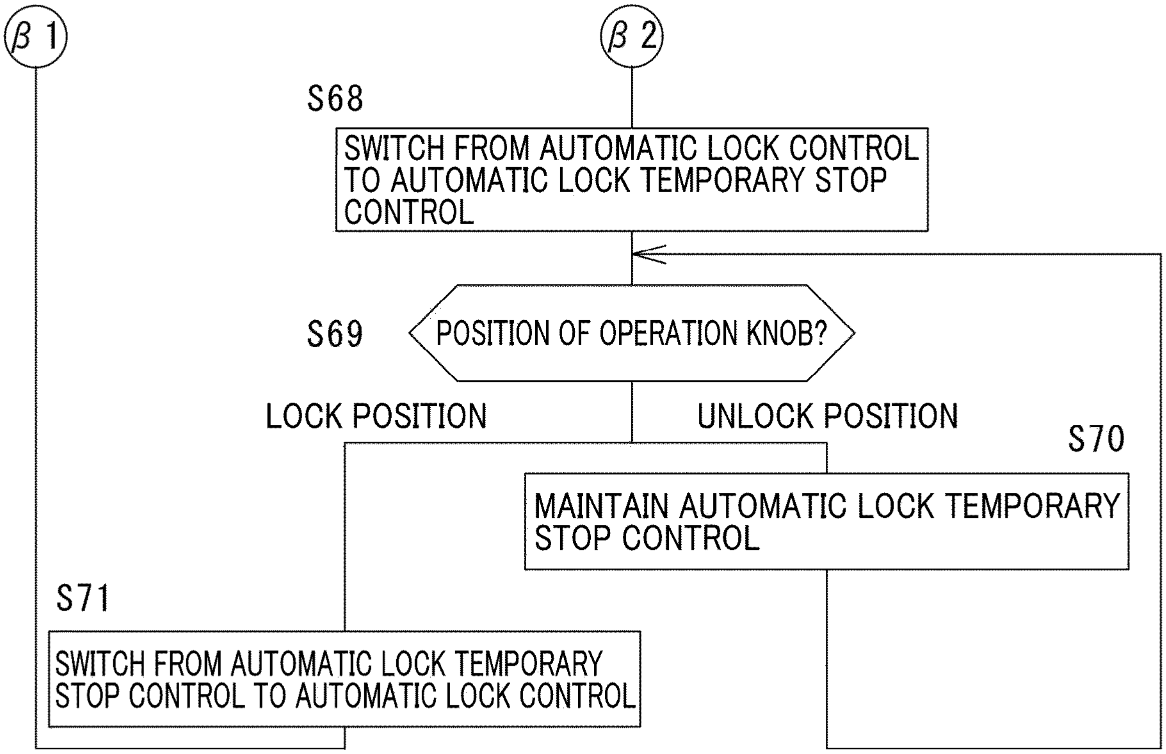
FIG. 20B is a flowchart for explaining control related to the self-lock temporary stop control of the electronic lock device according to the sixth embodiment of the present invention.

With reference to FIGS. 20A and 20B, the control related to the self-lock temporary stop control executed by the control portion 13 in the present embodiment will be described.

When it is detected that the operation knob 7 is in the "lock position" in step S61 and the operation knob 7 is in the "neutral position" in step S62, that is, when the operation knob 7 is operated from the "lock position" to the "neutral position" by the user, the timer 24 starts in step S63, and the LED light 17 is turned on to notify the user of an unstable state (the LED light 17 is turned off when, for example, 1 second elapses, and at that time, the buzzer 18 is driven). Measurement by the timer 24 is continued as it is.

When it is detected that the operation knob 7 is operated to a position other than the "neutral position" ("unlock position" or "lock position") before the time measured by the timer 24 reaches the set time Tset_e (sixth set time) in steps S64 and 65, that is, when the operation knob 7 is operated by the user to a position other than the "neutral position", the process returns to step S61. On the other hand, when the time measured by the timer 24 becomes equal to or greater than the set time Tset_c (sixth set time) in steps S64 and S65, that is, when it is detected that the operation knob 7 is maintained in the "neutral position" for equal to or greater than the set time Tset_e (sixth set time), the process proceeds to step S66. In step S66, the timer 24 is cleared and measurement is stopped. In step S67, the LED light 17 is turned off, and the buzzer 18 is driven for 1 second, for example. Furthermore, in step S68, the self-lock control is switched to the self-lock temporary stop control.

Next, when the position of the operation knob 7 is the "unlock position" in step S69, that is, when it is detected that the operation knob 7 is operated to the "unlock position" by the user, the self-lock temporary stop control is maintained in step S70, and the process returns to step S69. On the other hand, when the position of the operation knob 7 is the "lock position" in step S69, that is, when it is detected that the operation knob 7 is operated to the "lock position" by the user, the self-lock temporary stop control is switched to the self-lock control in step S71, and the process returns to step S61. At the time of switching, the user is notified of the switching by at least one of sound by drive of the buzzer 18 and visual display by drive of the LED light 17.

Seventh Embodiment

Figure 21:
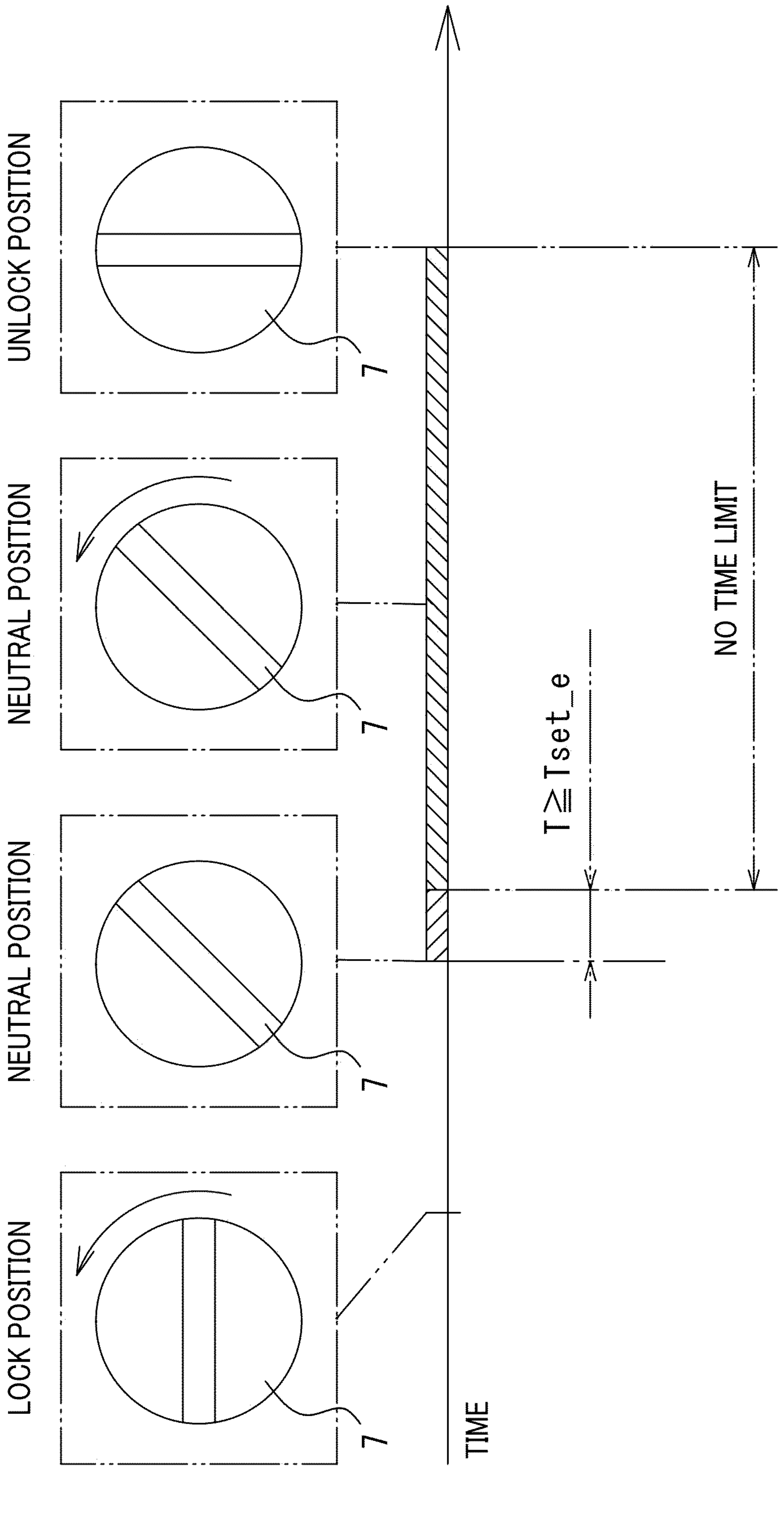
FIG. 21 is a time chart showing an example of an operation related to self-lock temporary stop control of the electronic lock device according to a seventh embodiment of the present invention.

FIG. 21 shows an outline of the operation of the operation knob 7 for switching from the self-lock control to the self-lock temporary stop control in the seventh embodiment. That is, when the operation knob 7 is operated from the "lock position" to the "neutral position" and is maintained in the "neutral position" for the set time Tset_e (sixth set time), which is, for example, 1 second, and then is operated from the "neutral position" to the "unlock position", the self-lock control is switched to the self-lock temporary stop control. In the fifth embodiment, the condition for switching to the self-lock temporary stop control is that the operation knob 7 is operated from the "neutral position" to the "unlock position" within the set time Tset_f (seventh set time) after the operation knob 7 is maintained in the "neutral position" for the set time Tset_e (FIGS. 17, 18A, and 18B). On the other hand, in the present embodiment, when the operation knob 7 is maintained in the "neutral position" for the set time Tset_e, there is no time limit, and when the operation knob 7 is operated from the "neutral position" to the "unlock position", the control is switched to the self-lock temporary stop control.

Figure 22A:
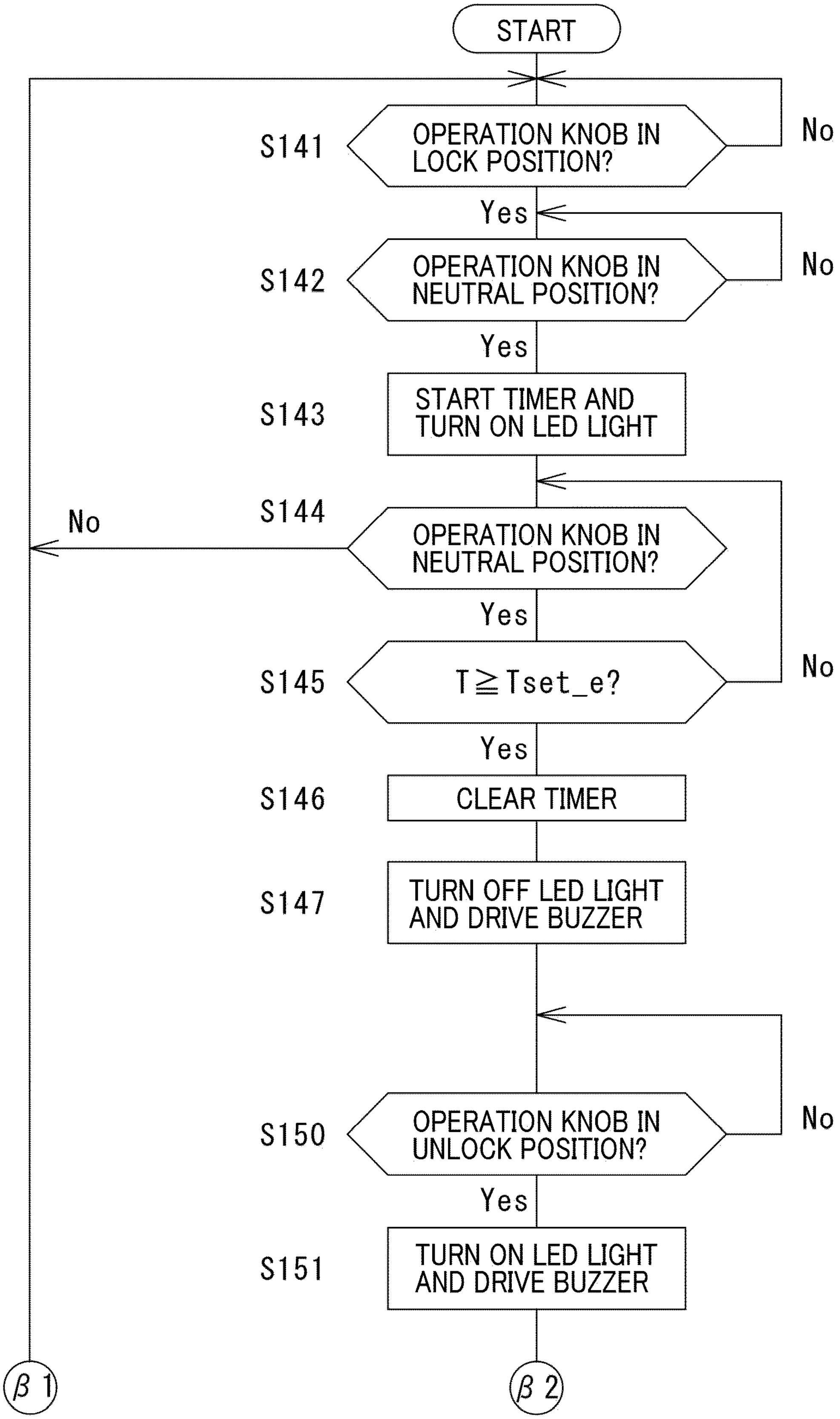
FIG. 22A is a conceptual diagram for explaining an operation of the operation knob for self-lock temporary stop control of an electronic lock device according to the seventh embodiment of the present invention.
Figure 22B:
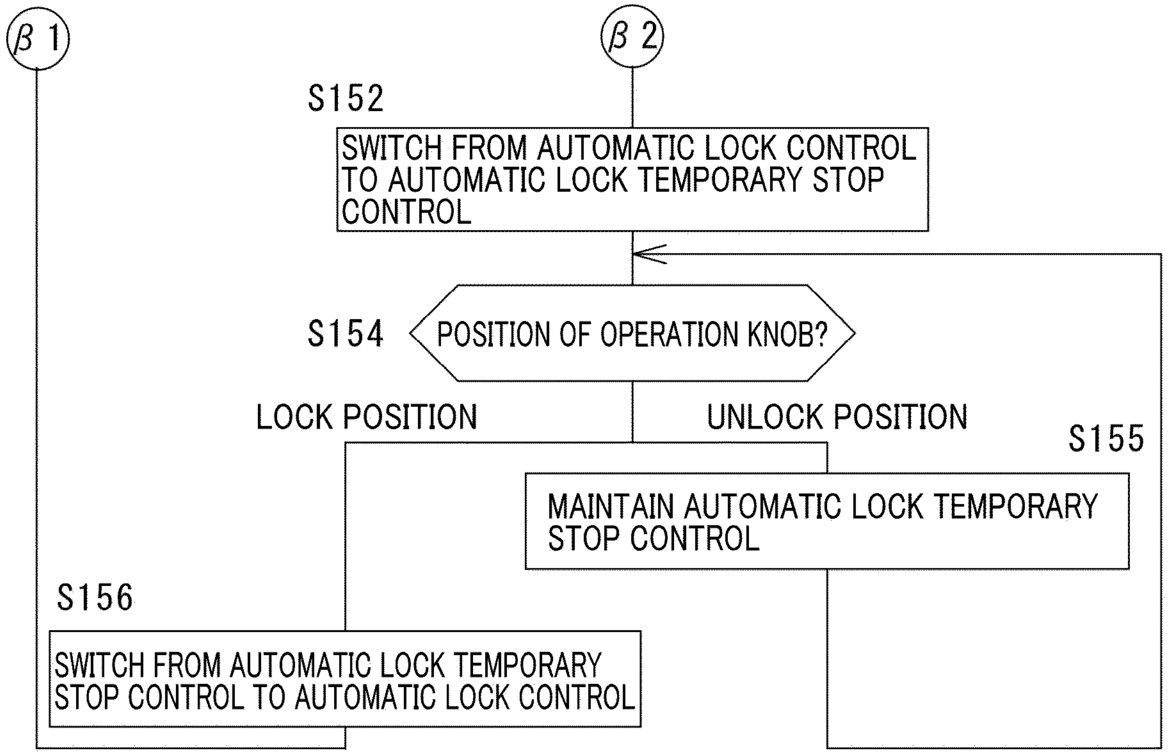
FIG. 22B is a flowchart for explaining control related to the self-lock temporary stop control of the electronic lock device according to the seventh embodiment of the present invention.

With reference to FIGS. 22A and 22B, in the present embodiment, the self-lock temporary stop control (steps S141 to 156) is identical to the control (steps S41 to S56 in FIGS. 18A and 18B) in the fifth embodiment except for the processing related to the condition that the operation in step S150 is within the set time Tset_f (seventh set time), that is, the absence of steps S48 and S49 in FIG. 18A and step S53 in FIG. 18B.

The operation position of the operation knob 7 may be detected by either the manual rotation switch 14 or the potential sensor 15, and the start timing of the timer start can be appropriately set. That is, the operation knob 7 in each embodiment may be operated within a predetermined time. The operation knob 7 needs not be of a rotation type, may be of a push type or a lever type, and the casing 5 may be provided with a display portion that displays the operation position of the operation knob 7.

In an embodiment in which the operation knob 7 is operated to the "neutral position", when the operation knob 7 continues to be held in the neutral position, a warning for calling attention may be issued by at least one of sound by drive of the buzzer 18 and visual display by drive of the LED light 17. Alternatively, the operation knob 7 may be forcibly rotated from the "neutral position" to the "unlock position" or the "lock position" by the motor 11.

The invention claimed is:

1. An electronic lock device comprising:

a body attached to a door including a lock/unlock portion for a switching operation between locking and unlocking;

a coupling portion mechanically coupled to the lock/unlock portion;

a manual operation portion that is provided in the body, operates integrally with the coupling portion, and is manually operable among a lock position where the door is locked by the lock/unlock portion via the coupling portion, an unlock position where the door is unlocked by the lock/unlock portion via the coupling portion, and a neutral position between the lock position and the unlock position;

a position detection portion that detects which of the lock position, the unlock position, and a neutral position the manual operation portion is positioned in;

a drive portion that drives the coupling portion to cause the lock/unlock portion to lock and unlock the door; and a control portion that can execute self-lock control in which the driving unit drives the coupling portion to cause the lock/unlock portion to lock the door and self-lock temporary stop control of temporarily stopping the self-lock control when a predetermined time elapses after the position detection portion detects that the lock/unlock portion has changed from the lock position to the unlock position, wherein the control portion switches from the self-lock control to the self-lock temporary stop control upon detecting that the manual operation portion is operated from the lock position to the neutral position and is maintained at the neutral position at least for a first set time or more based on an input from the position detection portion.

2. The electronic lock device according to claim 1, wherein after switching from the self-lock control to the self-lock temporary stop control, the control portion switches from the self-lock temporary stop control to the self-lock control upon detecting that the manual operation portion is operated to the lock position based on an input from the position detection portion, and continues the self-lock temporary stop control upon detecting that the manual operation portion is operated to the unlock position based on the input from the position detection portion.

3. The electronic lock device according to claim 1, wherein the control portion switches from the self-lock control to the self-lock temporary stop control upon detecting that the manual operation portion is operated from the lock position to the neutral position, is maintained at the neutral position for the first time or more, and is operated to the unlock position within a second set time based on an input from the position detection portion.

4. The electronic lock device according to claim 1, wherein the control portion switches from the self-lock control to the self-lock temporary stop control upon detecting that the manual operation portion is operated from the lock position to the neutral position, is maintained at the neutral position for the first set time or more, and then is operated to the unlock position based on an input from the position detection portion.

5. The electronic lock device according to claim 1, further comprising a notification portion that notifies a user of a change by at least one of sound and visual display, wherein the control portion drives the notification portion when switching from the self-lock control to the self-lock temporary stop control.

* * * * *